United States Patent
Okuno

(10) Patent No.: US 7,057,417 B2
(45) Date of Patent: Jun. 6, 2006

(54) VOLTAGE CONVERSION CIRCUIT AND SEMICONDUCTOR INTEGRATED CIRCUIT DEVICE PROVIDED WITH IT

(75) Inventor: Tomohisa Okuno, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/470,125

(22) PCT Filed: Jan. 21, 2002

(86) PCT No.: PCT/JP02/00394

§ 371 (c)(1),
(2), (4) Date: Jul. 25, 2003

(87) PCT Pub. No.: WO02/060042

PCT Pub. Date: Aug. 1, 2002

(65) Prior Publication Data
US 2004/0070434 A1    Apr. 15, 2004

(30) Foreign Application Priority Data
Jan. 25, 2001   (JP) .............................. 2001-016941

(51) Int. Cl.
 H03K 19/00   (2006.01)
 H03K 7/08    (2006.01)

(52) U.S. Cl. ............................ 326/99; 326/83; 327/172
(58) Field of Classification Search ................ 326/83, 326/86, 99; 327/172, 175, 35, 333
See application file for complete search history.

(56) References Cited

U.S. PATENT DOCUMENTS 4,848,923 A * 7/1989 Ziegler et al. .............. 374/117
6,166,562 A   12/2000 Mita et al.

FOREIGN PATENT DOCUMENTS

| JP | 60-54516 A  | 3/1985 |
| JP | 7-135643 A  | 5/1995 |
| JP | 10-242831 A | 9/1998 |
| JP | 11-233276 A | 8/1999 |

* cited by examiner

Primary Examiner—James H. Cho
(74) Attorney, Agent, or Firm—Birch, Stewart, Kolasch & Birch, LLP

(57) ABSTRACT

By using a first delay circuit that delays by a predetermined time a reference pulse signal having a constant pulse width and a second delay circuit that delays by an arbitrary time the output signal of the first delay circuit, a voltage conversion circuit generates an output pulse signal having a variable pulse period, and varies its output voltage according to the pulse period of this output pulse signal.

10 Claims, 24 Drawing Sheets

FIG.16

| LA | LB | LC | STATUS |
|----|----|----|--------|
| L  | L  | L  | NG     |
| L  | L  | H  | WARN   |
| L  | H  | L  | (NG)   |
| L  | H  | H  | (NG)   |
| H  | L  | L  | (NG)   |
| H  | L  | H  | OK     |
| H  | H  | L  | (NG)   |
| H  | H  | H  | FAST   |

FIG.19

| STATUS | LA | LB | LC | WF |
|---|---|---|---|---|
| NG | L | L | L | WF0 |
| WARN | L | L | H | H |
| (NG) | L | H | L | WF0 |
| (NG) | L | H | H | WF0 |
| (NG) | H | L | L | WF0 |
| OK | H | L | H | WF0 |
| (NG) | H | H | L | WF0 |
| FAST | H | H | H | L |

FIG.20

| STATUS | LA | LB | LC | WF | SC |
|---|---|---|---|---|---|
| NG,(NG), WARN | L | - | - | - | COMPU |
| | H | - | L | - | COMPU |
| OK | H | L | H | L | COMPD |
| | | | | H | COMP |
| FAST | H | H | L | L | COMPD |

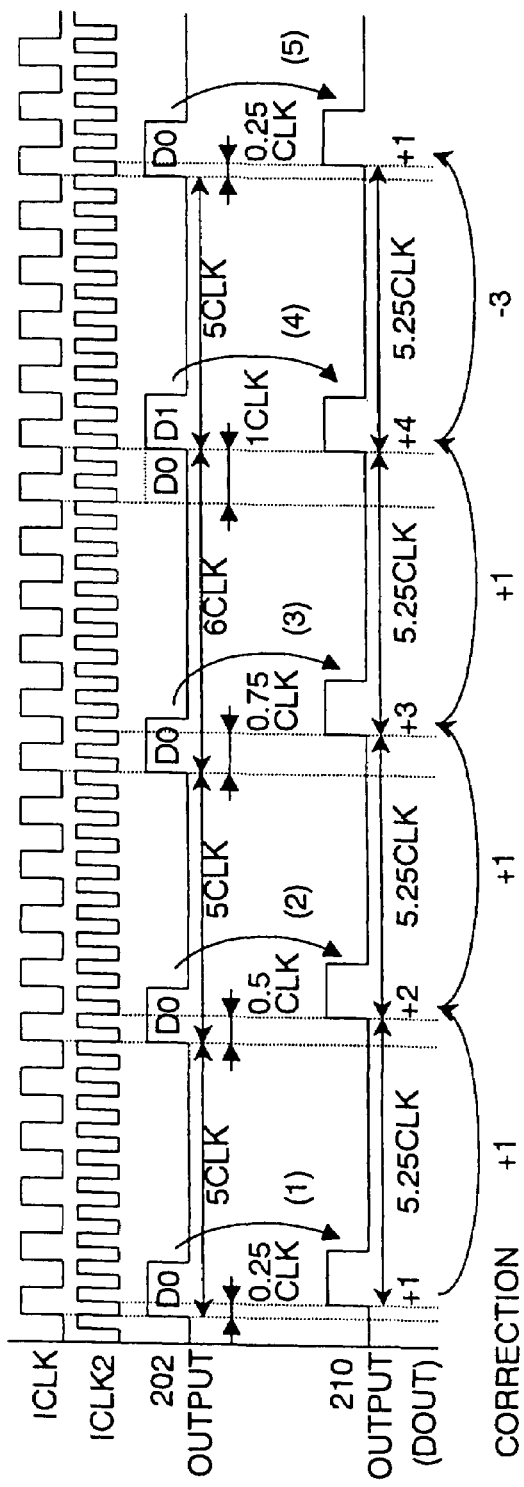
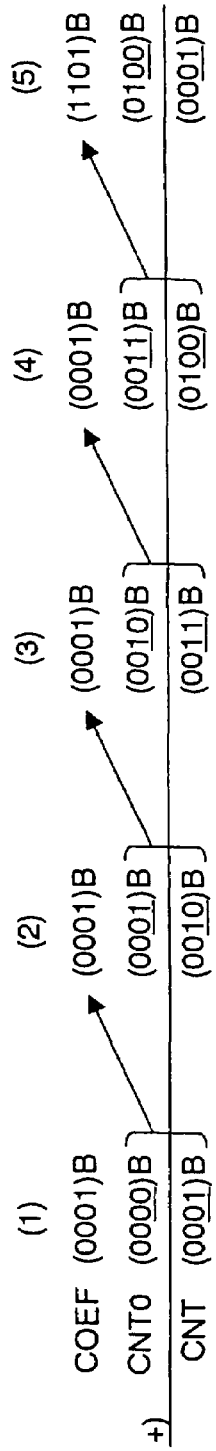
FIG.21A
FIG.21B

FIG.22

| | SHD | SQD | SH | SQ | COMP |
|---|---|---|---|---|---|
| | 0 | 0 | 0 | 0 | 0 |
| CORRECTION (1)→(2) | 0 | 0 | 0 | 1 | +1 |
| | 0 | 0 | 1 | 0 | +2 |
| | 0 | 0 | 1 | 1 | +3 |
| | 0 | 1 | 0 | 0 | -1 |
| | 0 | 1 | 0 | 1 | 0 |
| CORRECTION (2)→(3) | 0 | 1 | 1 | 0 | +1 |
| | 0 | 1 | 1 | 1 | +2 |
| | 1 | 0 | 0 | 0 | -2 |
| | 1 | 0 | 0 | 1 | -1 |
| | 1 | 0 | 1 | 0 | 0 |
| CORRECTION (3)→(4) | 1 | 0 | 1 | 1 | +1 |
| CORRECTION (4)→(5) | 1 | 1 | 0 | 0 | -3 |
| | 1 | 1 | 0 | 1 | -2 |
| | 1 | 1 | 1 | 0 | -1 |
| | 1 | 1 | 1 | 1 | 0 |

VOLTAGE CONVERSION CIRCUIT AND SEMICONDUCTOR INTEGRATED CIRCUIT DEVICE PROVIDED WITH IT

This application is the national phase under 35 U.S.C. § 371 of PCT International Application No. PCT/JP02/00394 which has an International filing date of Jan. 21, 2002, which designated the United States of America.

TECHNICAL FIELD

The present invention relates to a voltage conversion circuit for supplying an drive voltage to an integrated circuit, and relates also to a semiconductor integrated circuit device incorporating such a voltage conversion circuit.

BACKGROUND ART

In general, integrated circuits that perform arithmetic or other operations in synchronism with an operation clock are designed with large margins so that they always operate normally even in the presence of variations originating from the fabrication process, variations in the supply voltage, variations in temperature, and other factors. That is, such an integrated circuit is so designed that, even if a variation or other factor as mentioned above causes an increase in a delay time within its circuit, the operation of the integrated circuit as a whole is complete within one clock of its operation clock. Moreover, such an integrated circuit is supplied with a sufficiently high supply voltage so that it operates normally even when all conditions as mentioned above are at their worst.

Designing an integrated circuit with large margins and supplying it with a high supply voltage as described above, however, hinder achieving a higher operation rate and lower power consumption in it. To overcome this inconvenience, voltage conversion circuits have been under development that monitor the operation status of an integrated circuit and control the supply voltage thereto in such a way that the integrated circuit is supplied with the minimum drive voltage that it requires for normal operation.

FIG. 24 is a diagram showing an outline of the configuration of an example of a conventional voltage conversion circuit. The voltage conversion circuit shown in this figure is a prior-art technique disclosed in Japanese Patent Application Laid-Open No. H10-242831, and includes a duty ratio control circuit 901, a buffer circuit 902, a filter circuit 903, a critical path circuit 904, a delay circuit 905, a true/false judgment circuit 906, and an adder 907.

The duty ratio control circuit 901 is a circuit that controls the buffer circuit 902 to vary its output voltage, and includes a counter and a comparator circuit. The counter counts from 0 to $2^n-1$ (for example, when n=6, from 0 to 63) by incrementing its count every period of a clock signal (not shown) fed thereto, and then feeds the count, in the form of an n-bit signal NA, to the comparator circuit. Here, after $2^n-1$, the count returns to 0. The comparator circuit receives, in addition to the signal NA, an n-bit signal NB from the adder 907.

The comparator circuit is a circuit that controls the on/off states of a PMOS transistor M1 and an NMOS transistor M2 that together constitute the buffer circuit 902. The comparator circuit feeds control signals X1 and X2 to the gates of the transistors M1 and M2, respectively. The comparator circuit turns the levels of the control signals X1 and X2 to low when the signal NA is 0, and turns the levels of the control signals X1 and X2 to high when the signal NA coincides with the signal NB.

In the buffer circuit 902, the PMOS transistor M1 receives a first supply voltage at its source, and the NMOS transistor M2 receives a second supply voltage (here, the ground voltage) at its source. The drains of these two transistors are connected together, and the node at which they are connected together serves as the output end of the buffer circuit 902.

Accordingly, when the control signals X1 and X2 are low, the PMOS transistor M1 is on, and the NMOS transistor M2 is off. Thus, the output voltage of the buffer circuit 902 is roughly equal to the first supply voltage. On the other hand, when the control signals X1 and X2 are high, the PMOS transistor M1 is off, and the NMOS transistor M2 is on. Thus, the output voltage of the buffer circuit 902 is roughly equal to the second supply voltage (the ground voltage). As a result, the output voltage of the buffer circuit 902 is a pulsating voltage signal Y that rises when the signal NA becomes 0 and that falls when the signal NA becomes equal to the signal NB.

This voltage signal Y is smoothed by the filter circuit 903, which is composed of an inductor L1 and a capacitor C1, and is thereby formed into an output voltage Z. The output voltage Z is fed to an internal circuit (not shown) formed on the same circuit board so as to be used as the drive voltage of the internal circuit. The output voltage Z is also used as the supply voltage to the critical path circuit 904.

Let the length of time for which the PMOS transistor M1 remains on and the NMOS transistor M2 remains off (i.e., the length of time for which the control signals X1 and X2 remain low) be T1, called the turn-on time, and the length of time for which the PMOS transistor M1 remains off and the NMOS transistor M2 remains on (i.e., the length of time for which the control signals X1 and X2 remain high) be T2, called the turn-off time. Then, the output voltage Z of the filter circuit 903 is generally given by formula (1) below.

$$Z = \frac{T1}{T1+T2} \times VDD \tag{1}$$

In this formula, the turn-on time T1 (the numerator of the right side) represents the pulse width of the voltage signal Y, and the sum T1+T2 (the denominator of the right side) of the turn-on time T1 and the turn-off time T2 represents the pulse period of the voltage signal Y. That is, this formula indicates that the output voltage Z can be controlled by controlling the ratio (hereinafter called the duty ratio) of the pulse width to the pulse period of the voltage signal Y.

In the voltage conversion circuit configured as described above, by varying the value of the signal NB fed from the adder 907 to the comparator circuit of the duty ratio control circuit 901, the turn-on time T1 (the pulse width) is varied, and thereby the duty ratio of the voltage signal Y output from the buffer circuit 902 is controlled. In this way, it is possible to control the drive voltage (the output voltage Z) fed to the internal circuit (hereinafter, this method of controlling a duty ratio will be called the pulse width varying method). Here, as the means for setting the signal NB at the optimum value is adopted a method relying on detection of the operation rate of the critical path circuit 904.

The critical path circuit 904 is a circuit that serves as a duplicate of the path circuit that is considered to cause the longest delay to the signal passing therethrough within the internal circuit to which the output voltage Z is fed. As described above, the critical path circuit 904 receives, as its supply voltage, the output voltage Z of the filter circuit 903.

That is, the critical path circuit 904 monitors the drive voltage of the internal circuit, which is the target to which the supply voltage is supplied. Here, it is assumed that the operable voltage of the critical path circuit 904 is equal to that of the internal circuit.

When the critical path circuit 904 can operate from the output voltage Z of the filter circuit 903, the critical path circuit 904 feeds predetermined data to the true/false judgment circuit 906. Here, the true/false judgment circuit 906 receives the data fed from the critical path circuit 904 not only directly but also through the delay circuit 905 and thus with a predetermined delay, i.e., as delayed data.

If the true/false judgment circuit 906 does not receive the data directly from the critical path circuit 904, the true/false judgment circuit 906 judges that the internal circuit, to which the supply voltage is being supplied, is not operating normally, i.e., that the drive voltage of the internal circuit (the output voltage Z of the filter circuit 903) is too low. Thus, the true/false judgment circuit 906 feeds the adder 907 with a signal S1 that increments the value of the signal NB by one to increase the drive voltage.

If the true/false judgment circuit 906 receives the delayed data through the delay circuit 905, the true/false judgment circuit 906 judges that the internal circuit, to which the supply voltage is being supplied, would operate normally even if a delay were given thereto, i.e., that the drive voltage of the internal circuit is too high. Thus, the true/false judgment circuit 906 feeds the adder 907 with a signal S2 that decrements the value of the signal NB by one to decrease the drive voltage.

If the true/false judgment circuit 906 receives the data directly from the critical path circuit 904 but does not receive the delayed data through the delay circuit 905, the true/false judgment circuit 906 judges that the internal circuit, to which the supply voltage is being supplied, is being supplied with the optimum drive voltage. Thus, the true/false judgment circuit 906 feeds neither the signal S1 nor the signal S2 to the adder 907.

When fed with the signal S1 from the true/false judgment circuit 906, the adder 907 feeds the duty ratio control circuit 901 with a value obtained by adding 1 to the current value of the signal NB. By contrast, when fed with the signal S2 from the true/false judgment circuit 906, the adder 907 feeds the duty ratio control circuit 901 with a value obtained by adding −1 to the current value of the signal NB.

In this way, in the voltage conversion circuit configured as described above, the operation rate of the internal circuit that is the target to which the supply voltage is supplied is detected by the critical path circuit 904, delay circuit 905, and true/false judgment circuit 906, and the duty ratio of the voltage signal Y is controlled in such a way that, if the detected operation rate is too high, the drive voltage of the internal circuit (the output voltage Z) is decreased and that, if the detected operation rate is too low, the drive voltage of the internal circuit (the output voltage Z) is increased.

It is true that the voltage conversion circuit configured as described above can monitor the operation status of the internal circuit constituting an integrated circuit and feed the internal circuit with the minimum drive voltage that it requires for normal operation. This contributes to reducing the power consumption of the integrated circuit. Moreover, the voltage conversion circuit permits its output voltage Z to be varied in a wide range, and is therefore useful as a voltage step-down circuit for common integrated circuits.

Incidentally, for further reduction of the power consumption of the internal circuit, it is very effective to reduce the supply voltage to the devices themselves that constitute the internal circuit. For example, the power consumption of an internal circuit employing devices operating from a supply voltage of 0.5 V is 1/36 of the power consumption of an internal circuit employing devices operating from a supply voltage of 3 V. Thus, it is possible to achieve still lower power consumption by reducing the supply voltage to the internal circuit and by reducing the load current.

As the power consumption of the internal circuit is reduced, on a relative basis, the proportion of the power consumption of the voltage conversion circuit in the power consumption of the integrated circuit as a whole increases. Therefore, for further reduction of the power consumption of the integrated circuit as a whole, it is necessary to reduce the power consumption of the voltage conversion circuit itself.

One way to reduce the power consumption of the voltage conversion circuit configured as described above is to limit the variable range of the output voltage Z and thereby simplify the control and reduce the scale of the duty ratio control circuit 901, adder 907, and other circuits.

For example, in a case where power is supplied from a voltage conversion circuit that is supplied with an external supply voltage of about 3 V to an internal circuit that operates from 0.5 V, it is not necessary to feed the internal circuit with a high voltage close to the input voltage. Moreover, the devices constituting the internal circuit have their optimum operation voltage, and therefore, even with allowances made for variations originating from the fabrication process and variations in operating conditions, it is possible to limit the variable range of the output voltage Z to closer around their optimum operation voltage. By limiting the variable range of the output voltage Z in this way, it is possible to reduce the circuit scale of the voltage conversion circuit and thereby reduce its power consumption.

However, in a voltage conversion circuit adopting the pulse width varying method, in which the value of the signal NB fed from the adder 907 to the comparator circuit is varied so as to vary the turn-on time T1 (the pulse width) and thereby control the duty ratio of the voltage signal Y output from the buffer circuit 902, even when the variable range of the output voltage Z is limited, it is still necessary to provide a counter that operates at a high rate.

For example, in the conventional voltage conversion circuit configured as described above, the counter circuit operates at $2^n$ times (when n=6,64 times) the frequency of the voltage signal Y. Using a counter circuit that operates at such a high rate leads to an increase in the power consumption of the voltage conversion circuit itself, but keeping the counter circuit operating at a high rate is essential to vary the output voltage Z with high accuracy.

Thus, with the conventional voltage conversion circuit adopting the pulse width varying method, even if the variable range of the output voltage Z that is fed to an internal circuit operable from a low voltage is limited, the counter circuit needs to be kept operating at a high rate, and this makes it impossible to satisfactorily reduce the power consumption of the voltage conversion circuit itself.

DISCLOSURE OF THE INVENTION

An object of the present invention is to provide a voltage conversion circuit suitable for the output of a lower voltage, and to provide a semiconductor integrated circuit device incorporating such a voltage conversion circuit.

To achieve the above object, according to the present invention, a voltage conversion circuit is provided with a pulse generator circuit that generates a pulse signal having a constant pulse width and having a variable pulse period. Here, the output voltage is determined based on the ratio of the pulse width to the pulse period of the pulse signal generated by the pulse generator circuit.

BRIEF DESCRIPTION OF DRAWINGS

FIG. 16 is a table showing the relationship between the operation status signals LA, LB, and LC in the replica circuit 501 and the operation status of the internal circuit.

FIG. 19 is a truth table of the logic circuit implemented in the flag signal generator circuit 607.

FIG. 20 is a truth table of the logic circuit implemented in the coefficient select signal generator circuit 608.

FIGS. 21A and 21B are diagrams showing an example of how the coefficient COMP is corrected.

FIG. 22 is a table showing the relationship between the second select signals SH and SQ, the delayed signals SHD and SQD, and the coefficient COMP.

BEST MODE FOR CARRYING OUT THE INVENTION

Figure 1:
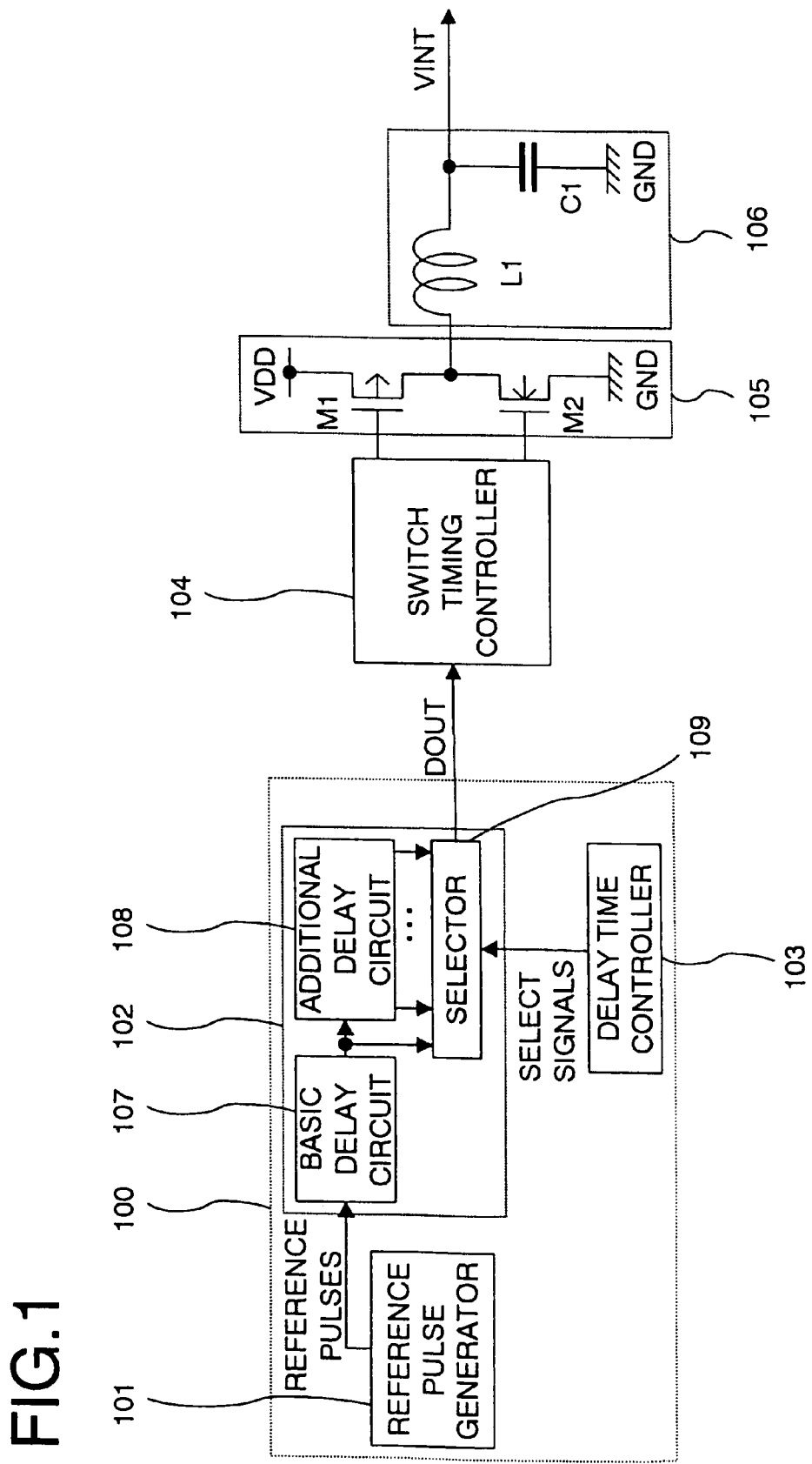
FIG. 1 is a diagram showing an outline of the configuration of the voltage conversion circuit of a first embodiment of the invention.

Hereinafter, as examples of voltage conversion circuits embodying the present invention, voltage conversion circuits (voltage step-down circuits) for supplying a drive voltage to an internal circuit provided in a semiconductor integrated circuit device will be described. FIG. 1 is a diagram showing an outline of the configuration of the voltage conversion circuit of a first embodiment of the invention. The voltage conversion circuit shown in this figure includes an output pulse generator circuit 100, a switch timing controller circuit 104, a switch circuit 105, and a filter circuit 106.

The output pulse generator circuit 100 is a circuit that generates an output pulse signal DOUT having a constant pulse width and a variable pulse period and that then feeds the output pulse signal DOUT to the switch timing controller circuit 104. The internal configuration and operation of the output pulse generator circuit 100 will be described in detail later.

The switch timing controller circuit 104 is a circuit that generates from the output pulse signal DOUT fed thereto a first and a second control signal φ1 and φ2 and that then feeds the first and second control signals φ1 and φ2 to the gates of a PMOS transistor M1 and an NMOS transistor M2, respectively, that constitute the switch circuit 105. That is, the switch timing controller circuit 104 controls the on/off states of the PMOS and NMOS transistors M1 and M2. The internal configuration and operation of the switch timing controller circuit 104 will be described in detail later.

In the switch circuit 105, the PMOS transistor M1 receives a first supply voltage (an external supply voltage VDD) at its source, and the NMOS transistor M2 receives a second supply voltage (a ground voltage GND) at its source. The drains of the two transistors are connected together, and the node at which they are connected together serves as the output end of the switch circuit 105. Thus, as the on/off sates of the PMOS and NMOS transistors M1 and M2 are controlled, the switch circuit 105 outputs, via its output end, a pulsating voltage signal.

The filter circuit 106 is a low-pass filter composed of an inductor L1 and a capacitor C1. One end of the inductor L1 is connected to the output end of the switch circuit 105, and the other end of the inductor L1 is connected to ground through the capacitor C1. The node at which the inductor L1 and the capacitor C1 are connected together serves as the output end of the filter circuit 106, and is connected to an internal circuit (not shown) or the like formed on the same substrate.

The pulsating voltage signal output from the switch circuit 105 is smoothed by the filter circuit 106 and is thereby formed into an output voltage VINT. This output voltage VINT is supplied to the internal circuit (not shown) so as to be used as the drive voltage of the internal circuit. In the figure, the filter circuit 106 is configured as an LC circuit; however, it may be configured in any other manner, for example as an RC circuit.

Here, the magnitude of the output voltage VINT can be controlled by varying the duty ratio (the ratio of the pulse width to the pulse period) of the pulsating voltage signal output from the switch circuit 105, i.e., the duty ratio of the first and second control signals φ1 and φ2.

In the voltage conversion circuit of this embodiment, an output pulse signal DOUT having a constant pulse width and a variable pulse period is generated by the output pulse generator circuit 100, and, by appropriately varying the pulse period of the output pulse signal DOUT, the duty ratio of the first and second control signals φ1 and φ2 is controlled. In this way, it is possible to control the drive voltage (the output voltage VINT) that is supplied to the internal circuit (hereinafter, this method of controlling a duty ratio will be called the pulse period varying method).

Next, the internal configuration and operation of the output pulse generator circuit 100 mentioned above will be described in detail. As shown in FIG. 1, the output pulse generator circuit 100 is composed of a reference pulse generator circuit 101, a first delay circuit 102, and a delay time controller circuit 103.

The reference pulse generator circuit 101 is a circuit that generates a reference pulse signal having a constant pulse width and that feeds it to the first delay circuit 102. The first delay circuit 102 is a circuit that generates a delayed pulse signal that is delayed by a predetermined time from the reference pulse signal, and is composed of a basic delay circuit portion 107, an additional delay circuit portion 108, and a selector portion 109. The delay time controller circuit 103 feeds select signals to the selector portion 109 in order to set the first delay circuit 102 to produce a delay time that yields the desired output voltage VINT. The internal configuration and operation of the delay time controller circuit 103 will be described in detail later.

Figure 2:
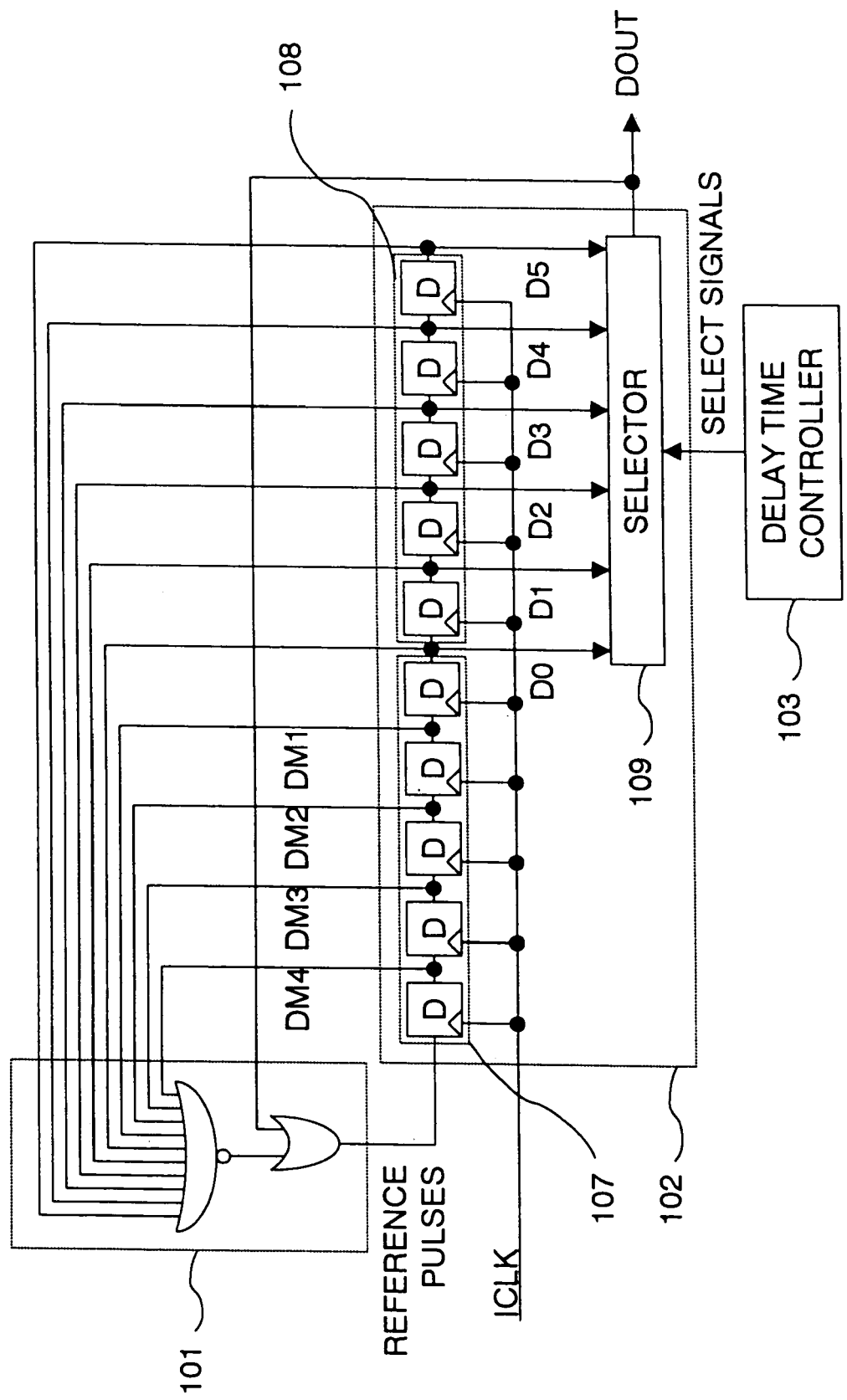
FIG. 2 is a diagram showing an outline of an example of the configuration of the reference pulse generator circuit 101 and the first delay circuit 102.

FIG. 2 is a diagram showing an outline of an example of the configuration of the reference pulse generator circuit 101 and the first delay circuit 102. First, the internal configuration of the first delay circuit 102 will be described. In the first delay circuit 102, the basic delay circuit portion 107 is a circuit that gives a delay of N times a predetermined unit time to the reference pulse fed thereto from the reference pulse generator circuit 101. The additional delay circuit portion 108 is a circuit that gives a delay of M times the predetermined unit time to the final output signal D0 of the basic delay circuit portion 107.

The figure shows a case where D flip-flop circuits that are triggered on the positive edges of an internal clock signal ICLK are used as unit time delay elements that constitute the basic delay circuit portion 107 and the additional delay circuit portion 108; however, the unit time delay elements may be built with flip-flop circuits or delay elements of any other type than D flip-flop circuits.

The basic delay circuit portion 107 is configured as a shift register (with N=5 delay stages) having five D flip-flop circuits connected in series. Accordingly, the individual flip-flop circuits output, via their output terminals, output signals DM4 to DM1 and D0 that are given one to five times the predetermined unit time, respectively, relative to the reference pulse signal. The number N of delay stages may be any number equal to or greater than one.

Likewise, the additional delay circuit portion 108 is configured as a shift register (with M=5 delay stages) having five D flip-flop circuits connected in series. Accordingly, the individual flip-flop circuits output, via their output terminals, output signals D1 to D5 that are given one to five times the predetermined unit time, respectively, relative to the output signal D0. The number M of delay stages may be any number equal to or greater than one.

All the flip-flop circuits constituting the basic delay circuit portion 107 and the additional delay circuit portion 108 receive, at their respective clock terminals, the same internal clock signal ICLK. As this internal clock signal ICLK, it is possible to use a clock signal generated in any manner, such as an external clock signal fed from outside the integrated circuit, a clock signal obtained by dividing such an external clock signal, or a clock signal generated by an oscillation circuit provided within the integrated circuit.

By building the basic delay circuit portion 107 and the additional delay circuit portion 108 with flip-flop circuits in this way, it is possible to build the first delay circuit 102 easily.

The selector portion 109 is a circuit that selectively outputs, as a delayed pulse signal, one of the final output signal D0 of the basic delay circuit portion 107 and the individual output signals D1 to D5 of the additional delay circuit portion 108 according to the select signals fed from the delay time controller circuit 103.

Figure 3:
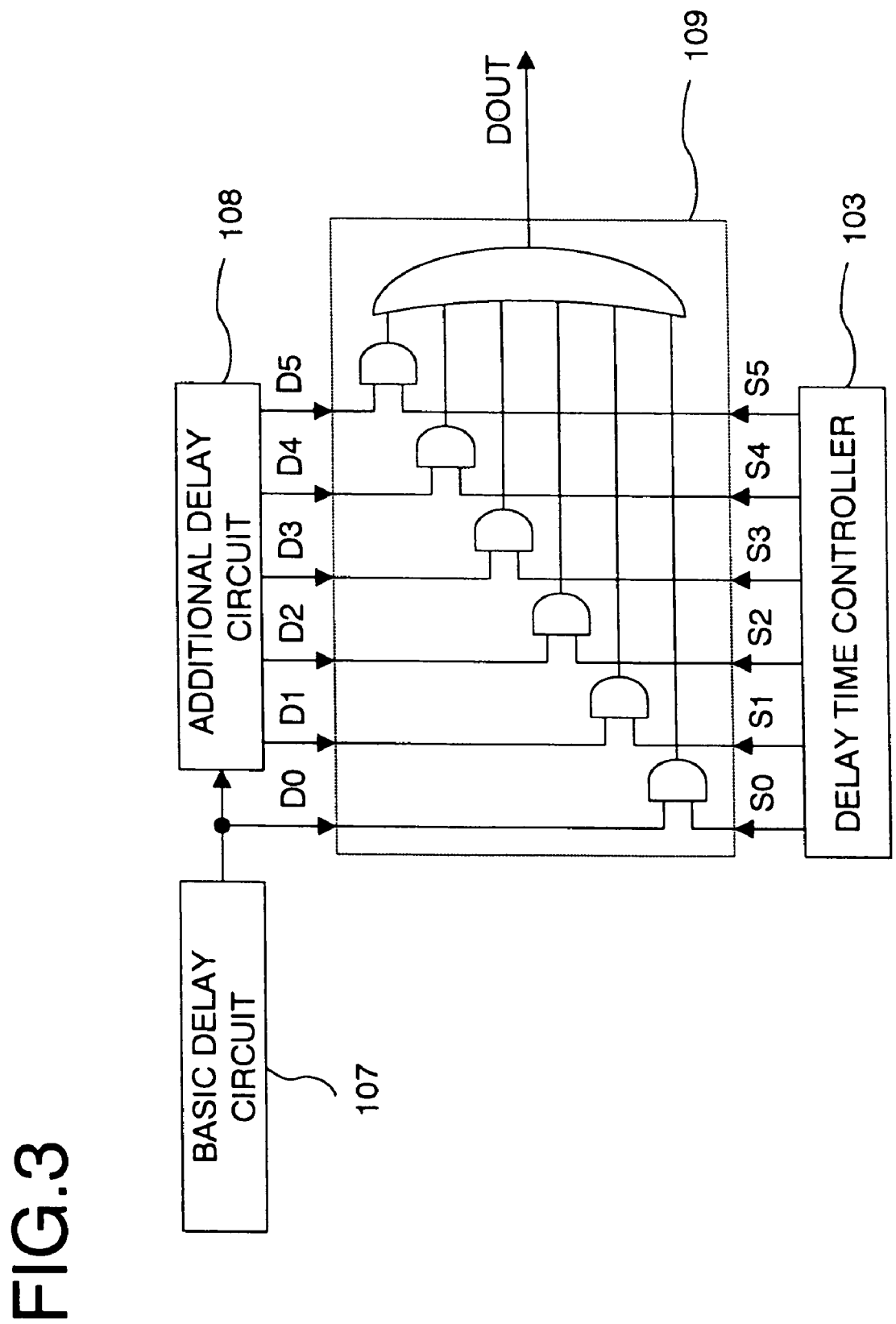
FIG. 3 is a diagram showing an outline of an example of the configuration of the selector portion 109.

FIG. 3 is a diagram showing an outline of an example of the configuration of the selector portion 109. As shown in this figure, the selector portion 109 is composed of six AND circuits each having two input terminals and an OR circuit having multiple input terminals.

The AND circuits receive, at their one input terminals, the final output signal D0 of the basic delay circuit portion 107 and the individual output signals D1 to D5 of the additional delay circuit portion 108, respectively. The AND circuits receive, at their other input terminals, the select signals S0 to S5, respectively, fed from the delay time controller circuit 103.

For example, to select the output signal D0 as the delayed pulse signal, the select signal S0 is turned high, and all the other select signals S1 to S5 are turned low. During the period in which the pulse signal is passing through the additional delay circuit portion 108, the select signals S0 to S5 are kept unchanged.

The OR circuit receives, at its input terminals, the output signals of the individual AND circuits, and outputs the OR of those signals as the delay pulse signal selected by the selector portion 109. The delayed pulse signal is fed, as the output pulse signal DOUT, to the switch timing controller circuit 104 and also to the reference pulse generator circuit 101.

Next, with reference back to FIG. 2, the internal configuration of the reference pulse generator circuit 101 will be described. The reference pulse generator circuit 101 is composed of a NOR circuit having multiple input terminals and an OR circuit having two input terminals. The NOR circuit receives, at its input terminals, the individual output signals DM4 to DM1 and D0 to D5 of the first delay circuit 102, and serves the function of starting the initial pulse of the reference pulse signal when the voltage conversion circuit is started up.

The OR circuit receives, at its one input terminal, the output signal of the NOR circuit, and receives, at its other input terminal, the delayed pulse signal selected by the selector portion 109. The output signal of the OR circuit is fed, as the reference pulse signal, to the first delay circuit 102.

Next, the operation of the output pulse generator circuit 100 configured as described above will be described. When the voltage conversion circuit is started up, the flip-flop circuits constituting the first delay circuit 102 are all reset by a reset signal (not shown), and thereby their output signals DM4 to DM1 and D0 to D5 are all turned low. Thus, the output signal of the NOR circuit, which is the NOR of the output signals DM4 to DM1 and D0 to D5, is high.

As a result, the output signal of the OR circuit, which is the OR of the output signal of the NOR circuit and the delayed pulse signal fed from the selector portion 109, is high. This starts the initial pulse of the reference pulse signal fed to the first delay circuit 102.

On the other hand, when the voltage conversion circuit is operating, one of the output signals DM4 to DM1 and D0 to D5 fed to the multiple input terminals of the NOR circuit is high, and thus the output signal of the NOR circuit is always low. Accordingly, the OR circuit feeds the delay pulse signal fed back from the selector portion 109 intact, as the reference signal, to the first delay circuit 102.

Through the operations described above, the reference pulse generator circuit 101 generates the reference pulse signal, having a constant pulse width, that is to be fed to the first delay circuit 102. The reference pulse generator circuit 101 may be configured in any other manner so long as it can generate a pulse signal equivalent to the reference pulse signal described above.

Next, how the first delay circuit 102 produces a delay will be described. FIGS. 4A to 4D are signal waveform diagrams showing examples of how the first delay circuit 102 produces a delay, each showing an example of the output pulse signal DOUT output from the first delay circuit 102. Here, it is assumed that the pulse width of the output pulse signal DOUT equals to 1 unit time and that the unit delay time in the flip-flop circuits constituting the first delay circuit 102 is equal to that pulse width, namely 1 unit time.

Figure 4A:
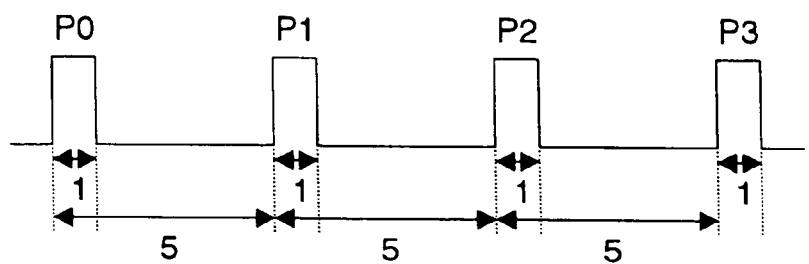
FIGS. 4A to 4D are signal waveform diagrams showing examples of how the first delay circuit 102 produces a delay.

FIG. 4A shows the signal waveform in a case where the output signal D0 of the basic delay circuit portion 107 is selected as the delayed pulse signal, i.e., the output pulse signal DOUT. In this case, the initial pulse P0 of the reference pulse signal fed to the first delay circuit 102 is given a delay of 5 unit times by the five flip-flop circuits constituting the basic delay circuit portion 107. Thus, in the output pulse signal DOUT appears a pulse P1 that is given a delay of 5 unit times relative to the initial pulse P0.

This pulse P1 is fed again to the reference pulse generator circuit 101, and is fed again, as the reference pulse signal, to the first delay circuit 102. Thereafter, in similar manners, every pulse fed to the first delay circuit 102 is given a delay of 5 unit times, and thus pulses P2 and P3 appear periodically. Accordingly, the output pulse signal DOUT has a pulse period of 5 unit times. Here, since the pulse width of each pulse in the output pulse signal DOUT is equal to 1 unit time, the output pulse signal DOUT has a duty ratio of 1/5.

Figure 4B:
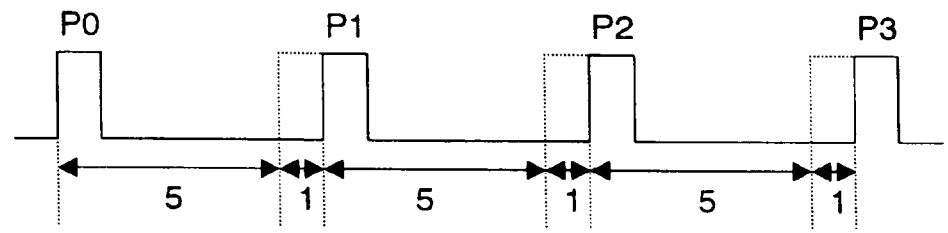

FIG. 4B shows the signal waveform in a case where the output signal D1 of the additional delay circuit portion 108 is selected as the output pulse signal DOUT. In this case, the initial pulse P0 of the reference pulse signal fed to the first delay circuit 102 is given a delay of 5 unit times by the five flip-flop circuits constituting the basic delay circuit portion 107, and is then given a further delay of 1 unit time by the first-stage flip-flop circuit of the additional delay circuit portion 108. Thus, in the output pulse signal DOUT appears a pulse P1 that is given a delay of (5+1) unit times relative to the initial pulse P0.

This pulse P1 is fed again to the reference pulse generator circuit 101, and is fed again, as the reference pulse signal, to the first delay circuit 102. Thereafter, in similar manners, every pulse fed to the first delay circuit 102 is given a delay of (5+1) unit times, and thus pulses P2 and P3 appear periodically. Accordingly, the output pulse signal DOUT has a pulse period of 6 unit times. Here, since the pulse width of each pulse in the output pulse signal DOUT is equal to 1 unit time, the output pulse signal DOUT has a duty ratio of 1/6.

Figure 4C:
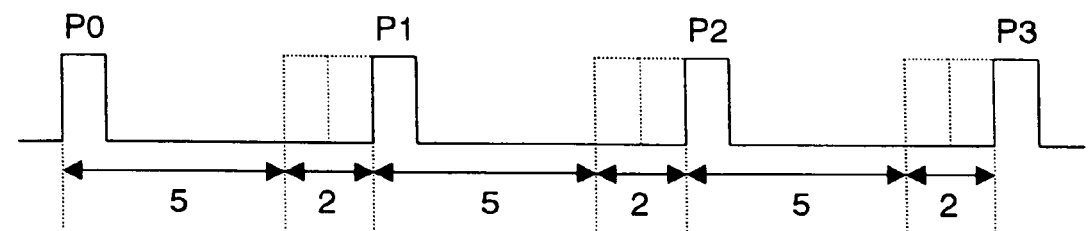

FIG. 4C shows the signal waveform in a case where the output signal D2 of the additional delay circuit portion 108 is selected as the output pulse signal DOUT. In this case, the output pulse signal DOUT has a pulse period of 7 unit times, and therefore the output pulse signal DOUT has a duty ratio of 1/7. Likewise, when the output signal D3, D4, or D5 of the additional delay circuit portion 108 is selected as the output pulse signal DOUT, the output pulse signal DOUT has a duty ratio of 1/8, 1/9, or 1/10, respectively.

Figure 4D:
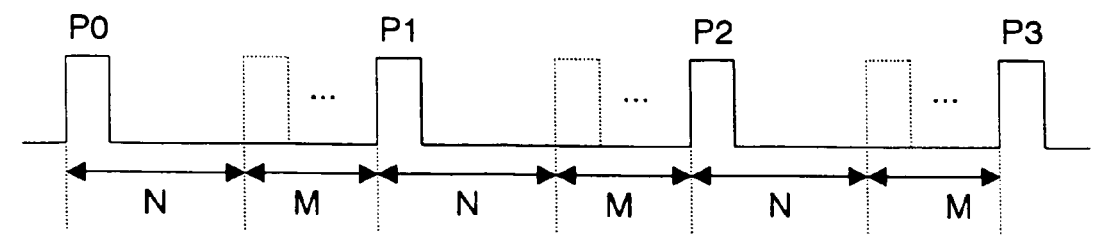

As a more generalized example, FIG. 4D shows the signal waveform in a case where the basic delay circuit portion 107 has N delay stages and the output signal of the M-th stage of the additional delay circuit portion 108 is selected as the output pulse signal DOUT. In this case, the output pulse signal DOUT has a pulse period of (N+M) unit times, and therefore the output pulse signal DOUT has a duty ratio of 1/(N+M).

Here, if it is assumed that the first and second control signals φ1 and φ2 generated by the switch timing controller circuit 104 are pulse signals that are basically the NOT of the output pulse signal DOUT, the magnitude of the output voltage VINT output from the voltage conversion circuit is given by formula (2) below.

$$VINT = \frac{1}{N+M} \times VDD \quad (2)$$

On the basis of formula (2) above, if it is assumed that the external supply voltage VDD that is supplied to the voltage conversion circuit of this embodiment is 3 V, then the output voltage VINT when the output signal D0 of the basic delay circuit portion 107 is selected as the output pulse signal DOUT is calculated to be 0.6 V Likewise, the output voltage VINT when one of the output signals D1 to D5 of the additional delay circuit portion 108 is selected as the output pulse signal DOUT is calculated to be 0.5 V, 0.43 V, 0.38 V, 0.33 V, or 0.3 V, respectively. Thus, the variable range of the output voltage VINT of the voltage conversion circuit of this embodiment is from 0.3 V to 0.6 V, with a unit variation step of 60 mV on average.

The upper limit of the variable range of the output voltage VINT can be adjusted by adjusting the delay time produced by the basic delay circuit portion 107 (the shortest delay time through the first delay circuit 102). On the other hand, the lower limit of the variable range of the output voltage VINT can be adjusted by adjusting the final delay time produced by the additional delay circuit portion 108 (the longest delay time through the first delay circuit 102). The unit variation step of the output voltage VINT can be adjusted by adjusting the unit delay time of each of the flip-flop circuits constituting the additional delay circuit portion 108.

As described above, with the voltage conversion circuit of this embodiment, which adopts the pulse period varying method, it is possible to control the output voltage VINT without the use of a control circuit, such as a counter circuit, that operates at a high rate as is used in a conventional voltage conversion circuit adopting the pulse width varying method. This makes it possible to reduce the circuit scale and operation frequency of a voltage conversion circuit than with conventional configurations, and thereby greatly reduce the power consumption of the voltage conversion circuit itself, contributing to reduction of the power consumption of the integrated circuit as a whole.

Moreover, the voltage conversion circuit of this embodiment is so configured as to control the output voltage VINT discretely within its variable range. This helps reduce the number of different states among which the control circuits (in this embodiment, the delay time controller circuit 103, selector portion 109, etc.) of the voltage conversion circuit need to be controlled (and thus the number of selectable output voltages), and thereby reduce the circuit scale and power consumption of those control circuits.

The embodiment described above deals with an example of the configuration of the voltage conversion circuit on the assumption that it generates from an external supply voltage VDD of 3 V an output voltage VINT for an internal circuit that operates from 0.5 V.

As described earlier, the devices constituting the internal circuit have their optimum operation voltage (in this case, 0.5 V), and therefore, even with allowances made for variations originating from the fabrication process and variations in operating conditions, it never becomes necessary to feed a high voltage close to the external supply voltage VDD (i.e., close to 3 V) to the internal circuit operating from 0.5 V. Therefore, to reduce the circuit scale of the control circuits constituting the voltage conversion circuit, it is preferable that the upper limit of the variable range of the output voltage VINT be set as low as possible.

For example, by setting the upper limit of the variable range of the output voltage VINT equal to or lower than ½ of the external supply voltage VDD, it is possible to reduce the number of different states among which the control circuits (in this embodiment, the delay time controller circuit 103, selector portion 109, etc.) of the voltage conversion circuit need to be controlled to half or less than half the number of such states in conventional configurations. By lowering the upper limit of the variable range of the output voltage VINT in this way, it is possible to reduce the circuit scale and power consumption of the control circuits.

With an internal circuit that operates from 0.5 V, if the supply voltage supplied thereto becomes 0.4 V or lower, its operation rate diminishes greatly; on the other hand, if the supply voltage becomes 0.6 V or higher, its operation rate becomes saturated. These facts indicate that, even with allowances made for variations originating from the fabrication process and variations in operating conditions, it is advisable to limit the variable range of the output voltage VINT supplied to the internal circuit to about ±20% of its optimum operation voltage (the center voltage of the variable range of the output voltage VINT).

In the example described above, the variable range of the output voltage VINT is 0.2 V, which is a little less than 7% of the external supply voltage VDD. By narrowing the variable range of the output voltage VINT in this way, it is possible to reduce the circuit scale and power consumption of the control circuits.

Lowering the upper limit of the variable range of the output voltage VINT or narrowing the variable range not only contributes to reduction of the power consumption of the voltage conversion circuit itself, but also helps reduce variations (ripples) in the output voltage VINT, a disadvantage of the pulse period varying method.

In general, variations appearing in the output voltage VINT are called ripples. Here, however, for convenience' sake, the peak-to-peak value of variations appearing in the output voltage VINT is called the ripple voltage ΔV. When an LC filter circuit is used as a smoothing means, the ripple voltage ΔV is given by formula (3) below.

$$\Delta V = \frac{(1-D) \cdot T^2}{8 \cdot L \cdot C} \times VINT \quad (3)$$

In formula (3) above, D represents the duty ratio and T represents the pulse period of the pulsating voltage that is fed to the LC filter circuit. Moreover, L represents the inductance and C represents the capacitance of the LC filter circuit.

The formula above indicates that the magnitude of the ripple voltage ΔV is proportional to the square of the pulse period T of the pulsating voltage signal fed to the LC filter circuit. Here, in a voltage conversion circuit adopting the pulse width varying method, the pulse period T is constant, and therefore the ripple voltage ΔV appearing in the output voltage VINT depends solely on the duty ratio D. On the other hand, in a voltage conversion circuit adopting the pulse period varying method, the pulse period T is variable, and therefore the ripple voltage ΔV appearing in the output voltage VINT depends on the duty ratio D and the pulse period T.

As described above, the ripple voltage ΔV is proportional to the square of the pulse period T, and therefore, as the pulse period T becomes longer, the ripple voltage ΔV tends to increase sharply. In the pulse period varying method, to make the output voltage VINT lower, the pulse period T needs to be made longer. Thus, the ripple voltage ΔV is high when the desired output voltage VINT is low.

Moreover, in a voltage conversion circuit adopting the pulse period varying method, if the variable range of the output voltage VINT is made unnecessarily wide, there arises a great difference between the pulse period when the output voltage VINT is at the upper limit of its variable range and the pulse period when it is at the lower limit of its variable range. This causes the ripple voltage ΔV to vary greatly as the output voltage VINT is varied, and thus makes it impossible to control the output voltage VINT with high accuracy.

By contrast, in the voltage conversion circuit of this embodiment, the upper limit of the variable range of the output voltage VINT is lowered so as to narrow the variable range, and in addition the pulse period varying method is used. This configuration makes it possible to reduce the difference between the pulse period when the output voltage VINT is at the upper limit of its variable range and the pulse period when it is at the lower limit of its variable range, and thus makes it possible to reduce the variation of the ripple voltage ΔV to a practically negligible degree. Moreover, this configuration permits the entire variable range of the pulse period T to be shifted to shorter periods, and thus makes it possible to reduce the ripple voltage ΔV when the desired output voltage VINT is low.

Figure 5:
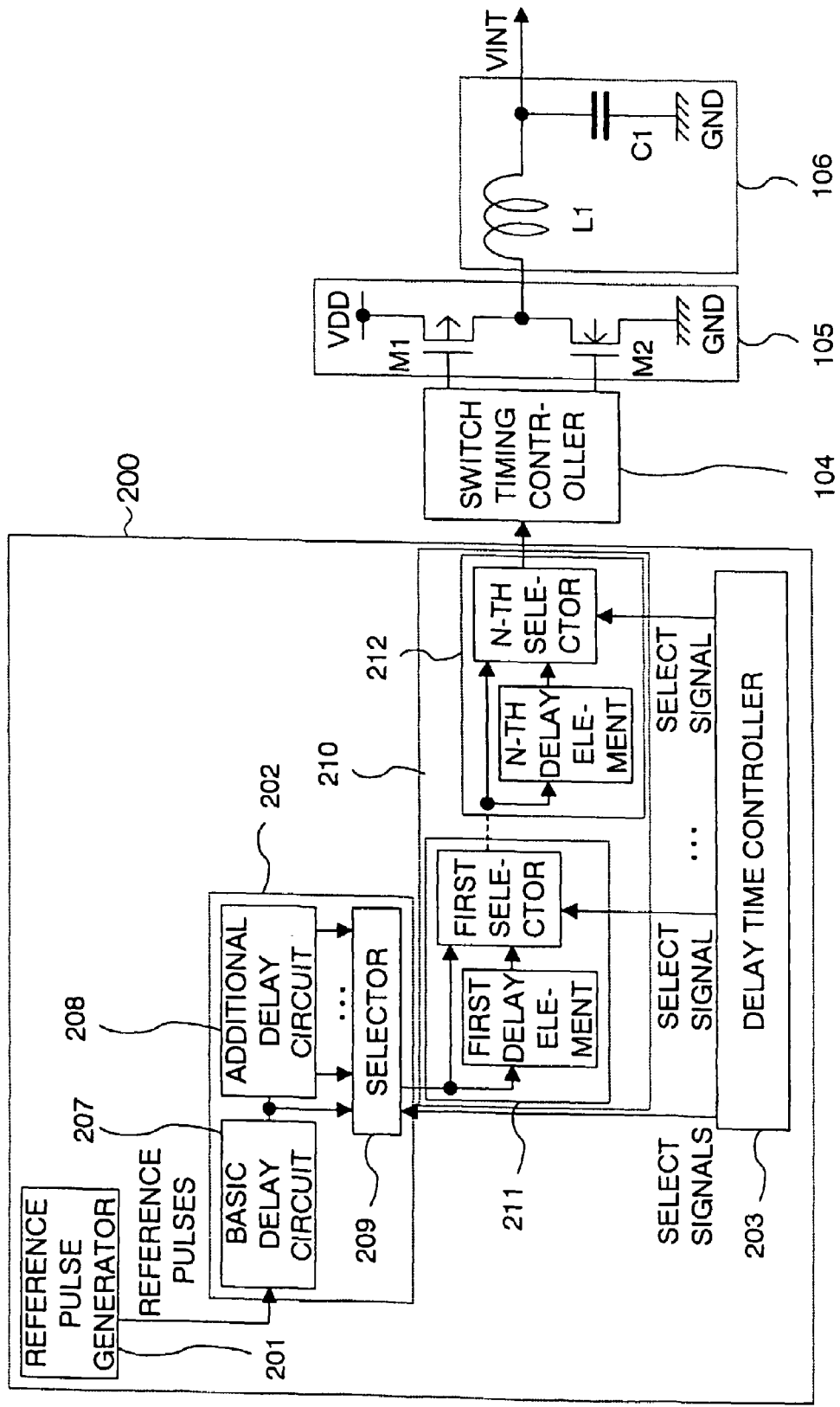
FIG. 5 is a diagram showing an outline of the configuration of the voltage conversion circuit of a second embodiment of the invention.

Next, the voltage conversion circuit of a second embodiment of the invention will be described. FIG. 5 is a diagram showing an outline of the configuration of the voltage conversion circuit of the second embodiment of the invention. As shown in this figure, the voltage conversion circuit of this embodiment has basically the same configuration as the voltage conversion circuit of the first embodiment (see FIG. 1). Therefore, here, such circuit blocks as are configured and operate in the same manner as in the first embodiment are identified with the same reference numerals and symbols, and their explanations will not be repeated. In the following descriptions, emphasis will be placed on the output pulse generator circuit 200, of which the configuration characterizes this embodiment.

The output pulse generator circuit 200 is a circuit that generates an output pulse signal DOUT having a constant pulse width and a variable pulse period and that then feeds the output pulse signal DOUT to the switch timing controller circuit 104. In this embodiment, the output pulse generator circuit 200 includes, in addition to a reference pulse generator circuit 201, a first delay circuit 202, and a delay time controller circuit 203, a second delay circuit 210.

The reference pulse generator circuit 201 is a circuit that generates a reference pulse signal having a constant pulse width and that feeds it to the first delay circuit 202. The first delay circuit 202 is a circuit that generates a delayed pulse signal that is delayed by a predetermined time from the reference pulse signal, and is composed of a basic delay circuit portion 207, an additional delay circuit portion 208, and a selector portion 209.

The second delay circuit 210 is a circuit composed of a plurality of arbitrary circuit delay portions connected in series, each selectively outputting one of a pulse signal fed thereto or a delayed pulse signal that is delayed for a predetermined time from that pulse signal. The second delay circuit 210 thus generates a delayed pulse signal that is further delayed for a predetermined time from the output signal of the first delay circuit 202. In the figure, of the plurality of arbitrary delay circuit portions, only the first-stage arbitrary delay circuit portion 211 and the last-stage (the n-th stage) arbitrary delay circuit portion 212 are shown. The first-stage arbitrary delay circuit portion 211 is composed of a first delay element and a first selection portion, and the last-stage arbitrary delay circuit portion 212 is composed of an n-th delay element and an n-th selection portion.

The delay time controller circuit 203 feeds select signals to the selector portion 209 of the first delay circuit 202 and to the first to n-th selection portions of the second delay circuit 210 in order to set the first and second delay circuits 202 and 210 to produce delay times that yield the desired output voltage VINT. The internal configuration and operation of the delay time controller circuit 203 will be described in detail later.

Figure 6:
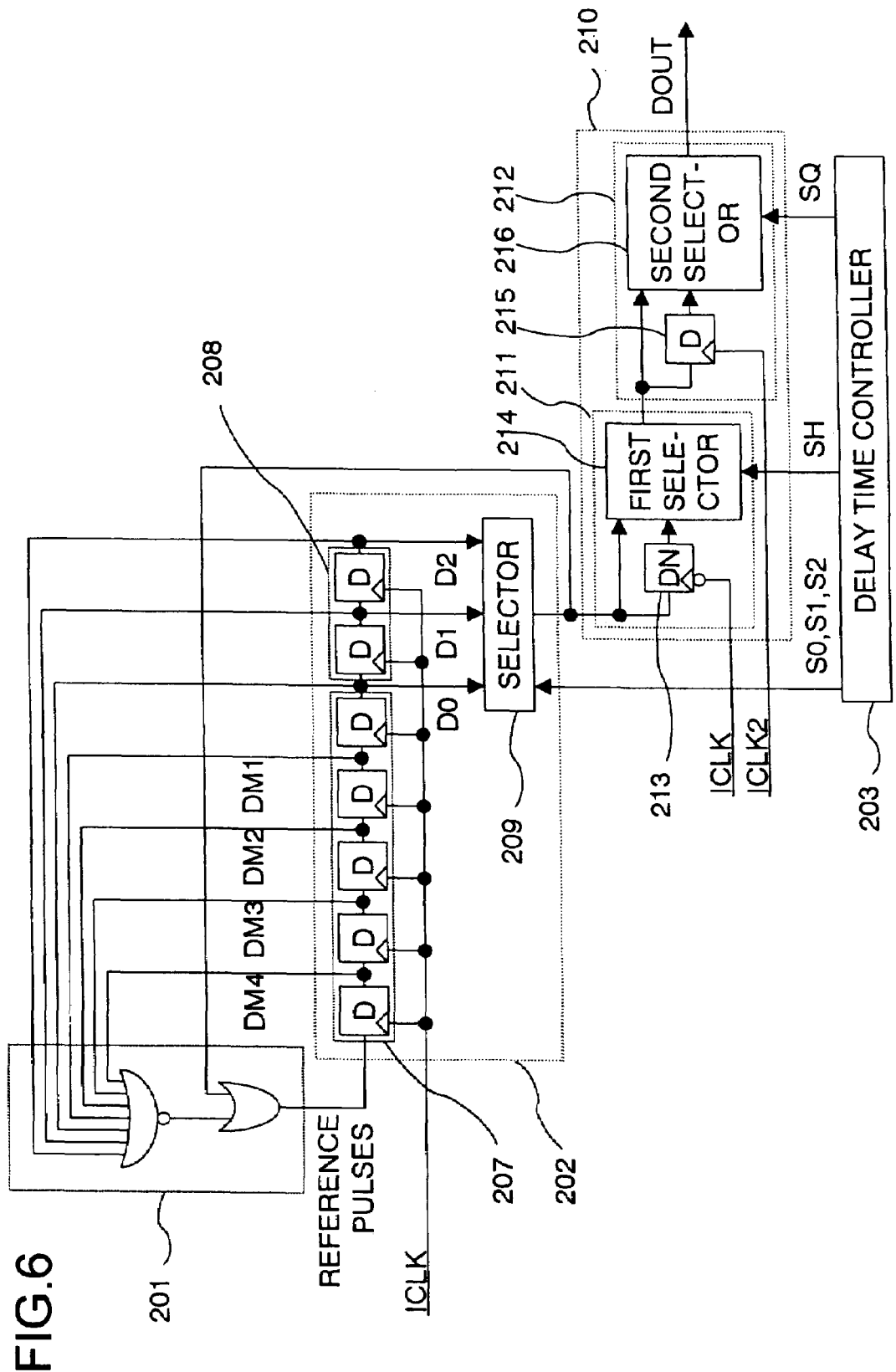
FIG. 6 is a diagram showing an outline of an example of the configuration of the reference pulse generator circuit 201, the first delay circuit 202, and the second delay circuit 210.

FIG. 6 is a diagram showing an outline of an example of the configuration of the reference pulse generator circuit 201, the first delay circuit 202, and the second delay circuit 210. As shown in this figure, the reference pulse generator circuit 201 is composed of a NOR circuit having multiple input terminals and an OR circuit having two input terminals, and its configuration and operation are the same as in the first embodiment (see FIG. 2). Therefore, in the following descriptions, the explanation of the reference pulse generator circuit 201 will not be repeated, and emphasis will be placed on the first delay circuit 202 and the second delay circuit 210.

First, the first delay circuit 202 will be described. In the first delay circuit 202, the basic delay circuit portion 207 is a circuit that gives a delay of N times a predetermined unit time to the reference pulse fed thereto from the reference pulse generator circuit 201. The additional delay circuit portion 208 is a circuit that gives a delay of M times the predetermined unit time to the final output signal D0 of the basic delay circuit portion 207.

In this embodiment, D flip-flop circuits that are triggered on the positive edges of an internal clock signal ICLK are used as unit time delay elements that constitute the basic delay circuit portion 207 and the additional delay circuit portion 208. By building the basic delay circuit portion 207 and the additional delay circuit portion 208 with flip-flop circuits in this way, it is possible to build the first delay circuit 202 easily. Needless to say, the unit time delay elements may be built with flip-flop circuits or delay elements of any other type than D flip-flop circuits.

The basic delay circuit portion 207 is configured as a shift register (with N=5 delay stages) having five D flip-flop circuits connected in series. Accordingly, the individual flip-flop circuits output, via their output terminals, output signals DM4 to DM1 and D0 that are given one to five times the predetermined unit time, respectively, relative to the reference pulse signal. The number N of delay stages may be any number equal to or greater than one.

Likewise, the additional delay circuit portion 208 is configured as a shift register (with M=2 delay stages) having two D flip-flop circuits connected in series. Accordingly, the individual flip-flop circuits output, via their output terminals, output signals D1 and D2 that are given one and two times the predetermined unit time, respectively, relative to the output signal D0. The number M of delay stages may be any number equal to or greater than one.

The selector portion 209 is a circuit that selectively outputs, as a delayed pulse signal, one of the final output signal D0 of the basic delay circuit portion 207 and the individual output signals D1 and D2 of the additional delay circuit portion 208 according to first select signals S0, S1, and S2 fed from the delay time controller circuit 203. The delayed pulse signal selected by the selector portion 209 is fed to the second delay circuit 210 and to the reference pulse generator circuit 201.

Next, the second delay circuit 210 will be described. As described above, the second delay circuit 210 is composed of n stages (in the figure, n=2) of arbitrary delay circuit portions 211 and 212 connected in series, and its input end is connected to the output end of the first delay circuit 202 (i.e., the output end of the selector portion 209). The first-stage arbitrary delay circuit portion 211 is composed of a first delay element 213 and a first selection portion 214, and the last-stage (second-stage) arbitrary delay circuit portion 212 is composed of a second delay element 215 and a second selection portion 216.

In the first-stage arbitrary delay circuit portion 211, the first delay element 213 is a circuit that gives a further delay of a predetermined time to the delayed pulse signal output from the first delay circuit 202. The delay time produced by the first delay element 213 may be set with a control signal fed from outside, or may be previously set internally.

In the voltage conversion circuit of this embodiment, a DN flip-flop circuit that is triggered on the negative edges of the internal clock signal ICLK is used as the first delay element 213. Accordingly, the first delay element 213 feeds the first selection portion 214 with an output signal $D0_{1/2}$, $D1_{1/2}$, or $D2_{1/2}$ that is given a delay of half the period of the internal clock signal ICLK (i.e., 0.5 times the predetermined unit time) relative to the corresponding one of the output signals D0, D1, and D2 as selected by the selector portion 209.

In the first-stage arbitrary delay circuit portion 211, the first selection portion 214 selectively outputs one of the output signal of the selector portion 209 and the output signal of the first delay element 213 according to a second select signal SH fed from the delay time controller circuit 203. Thus, the first selection portion 214 feeds one of the output signals D0, $D0_{1/2}$, D1, $D1_{1/2}$, D2, and $D2_{1/2}$ to the arbitrary delay circuit portion 212 in the next stage.

All the flip-flop circuits constituting the first delay circuit and the first delay element 213 receive, at their respective clock terminals, the same internal clock signal ICLK. As this internal clock signal ICLK, it is possible to use a clock signal generated in any manner, such as an external clock signal fed from outside the integrated circuit, a clock signal obtained by dividing such an external clock signal, or a clock signal generated by an oscillation circuit provided within the integrated circuit. The first delay element 213 may be built with a flip-flop circuit or delay element of any other type than a DN flip-flop circuit.

In the second-stage arbitrary delay circuit portion 212, the second delay element 215 is a circuit that gives a further delay of a predetermined time to the delayed pulse signal output from the first-stage arbitrary delay circuit portion 211. The delay time produced by the second delay element 215 may be set with a control signal fed from outside, or may be previously set internally.

In the voltage conversion circuit of this embodiment, a D flip-flop circuit that is triggered on the positive edges of an internal clock signal ICLK2 is used as the second delay element 215. Here, the internal clock signal ICLK2 is a double-rate clock signal of the internal clock signal ICLK, and thus has twice the frequency of the internal clock signal ICLK. Accordingly, the second delay element 215 feeds the second selection portion 216 with an output signal $D0_{1/4}$, $D0_{3/4}$, $D1_{1/4}$, $D1_{3/4}$, $D2_{1/4}$, or $D2_{3/4}$ that is given a delay of ¼ of the period of the internal clock signal ICLK (i.e., 0.25 times the predetermined unit time) relative to the corresponding one of the output signals D0, $D0_{1/2}$, D1, $D1_{1/2}$, D2, and $D2_{1/2}$ as selected by the first selection portion 214.

In the second-stage arbitrary delay circuit portion 212, the second selection portion 216 selectively outputs one of the output signal of the first selection portion 214 and the output signal of the second delay element 215 according to a second select signal SQ fed from the delay time controller circuit 203. Thus, the second selection portion 213 feeds one of the output signals D0, $D0_{1/4}$, $D0_{1/2}$, $D0_{3/4}$, D1, $D1_{1/4}$, $D1_{1/2}$, $D1_{3/4}$, D2, $D2_{1/4}$, $D2_{1/2}$, or $D2_{3/4}$ to the switch timing controller circuit 104 in the next stage.

Figure 7:
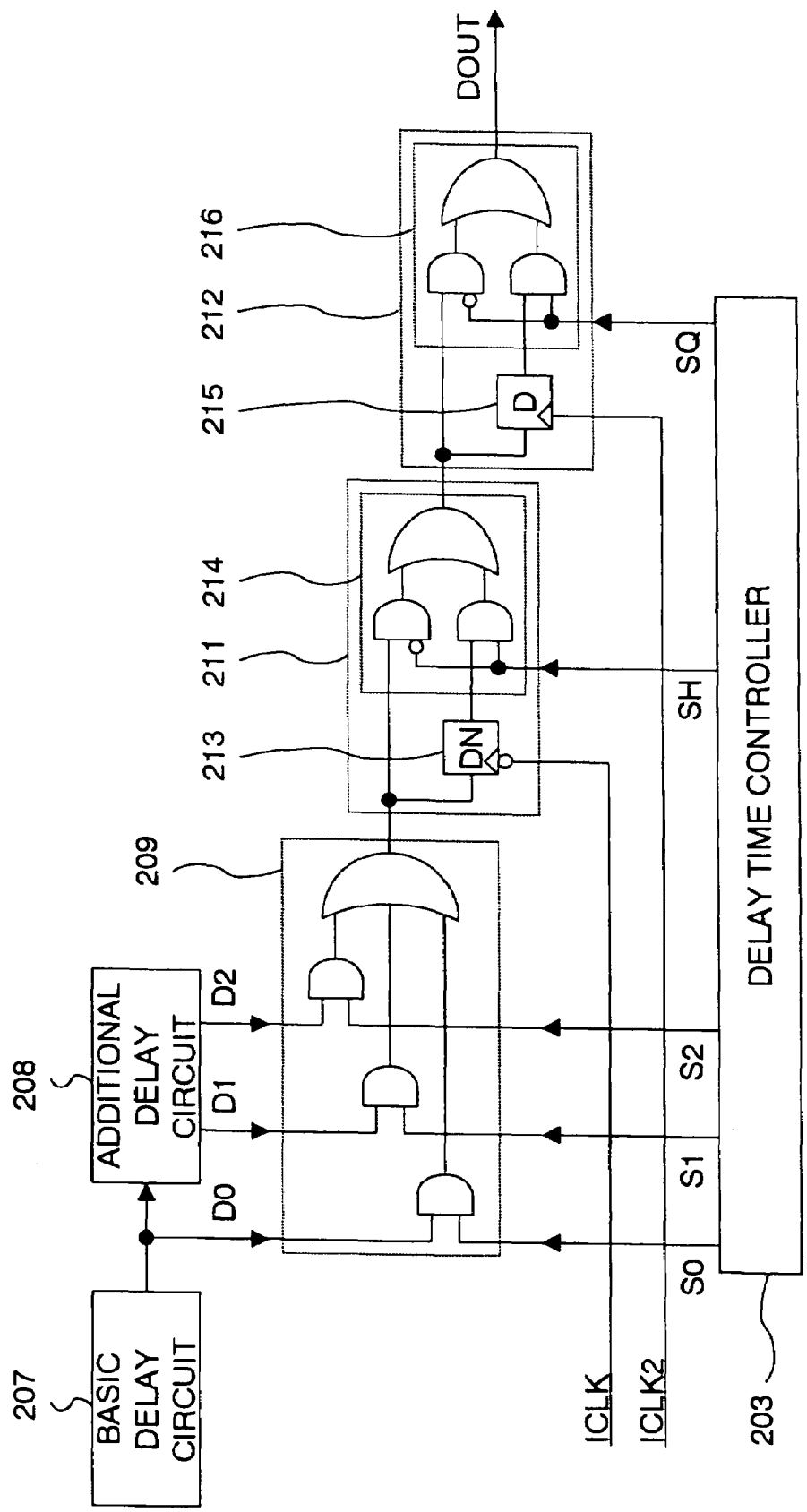
FIG. 7 is a diagram showing an outline of an example of the configuration of the selector portion 209, the first selector portion 214, and the second selector portion 216.

FIG. 7 is a diagram showing an outline of an example of the configuration of the selector portion 209, the first selection portion 214, and the second selection portion 216. As shown in this figure, the selector portion 209 is composed of three AND circuits each having two input terminals and an OR circuit having multiple input terminals. The first selection portion 214 is composed of two AND circuits each having two input terminals and an OR circuit having two input terminals. Likewise, the second selection portion 216 is composed of two AND circuits each having two input terminals and an OR circuit having two input terminals.

First, the configuration of the selector portion 209 will be described. The AND circuits receive, at their one input terminals, the final output signal D0 of the basic delay circuit portion 207 and the individual output signals D1 and D2 of the additional delay circuit portion 208, respectively. The AND circuits receive, at their other input terminals, the first select signals S0, S1, and S2 fed from the delay time controller circuit 203. During the period in which the pulse signal is passing through the additional delay circuit portion 208, the select signals S0, S1, and S2 are kept unchanged. The OR circuit receives, at its input terminals, the output signals of the individual AND circuits, and outputs the OR of those signals as the delay pulse signal selected by the selector portion 209.

Next, the configuration of the first selection portion 214 will be described. The AND circuits receive, at their one input terminals, the output signal of the selector portion 209 and the output signal of the first delay element 213. The AND circuits receive, at their other input terminals, the second select signal SH fed from the delay time controller circuit 203. Here, the AND circuit that receives the output signal of the selector portion 209 is fed with an inverted version of the second select signal SH. During the period in which the pulse signal is passing through the additional delay circuit portion 208, the second select signal SH is kept unchanged. The OR circuit receives, at its input terminals, the output signals of the individual AND circuits, and outputs the OR of those signals as the delay pulse signal selected by the first selection portion 214.

Next, the configuration of the second selection portion 216 will be described. The AND circuits receive, at their one input terminals, the output signal of the first selection portion 214 and the output signal of the second delay element 215. The AND circuits receive, at their other input terminals, the second select signal SQ fed from the delay time controller circuit 203. Here, the AND circuit that receives the output signal of the first selection portion 214 is fed with an inverted version of the second select signal SQ. During the period in which the pulse signal is passing through the additional delay circuit portion 208, the second select signal SQ is kept unchanged. The OR circuit receives, at its input terminals, the output signals of the individual AND circuits, and outputs the OR of those signals as the delay pulse signal selected by the second selection portion 216.

For example, to select the output signal D0 as the output pulse signal DOUT, the selector portion 209 is made to select the output signal D0, and the first and second selection portions 214 and 216 are made to select the delayed pulse signal fed directly from the selector portion 209. To achieve this, the first select signal S0 is turned high, with the other first select signals S1 and S2 turned low, and the second select signals SH and SQ are both turned low.

To select as the output pulse signal DOUT the output signal $D0_{1/4}$, which is delayed by ¼ of the period of the internal clock signal ICLK (i.e., 0.25 times the predetermined unit time) from the output signal D0, the selector portion 209 is made to select the output signal D0, the first selection portion 214 is made to select the output signal fed directly from the selector portion 209, and the second selection portion 216 is made to select the output signal fed from the second delay element 215. To achieve this, the first select signal S0 is turned high, with the other first select signals S1 and S2 turned low, and the second select signals SH and SQ are turned low and high, respectively.

To select as the output pulse signal DOUT the output signal $D0_{1/2}$, which is delayed by half the period of the internal clock signal ICLK (i.e., 0.5 times the predetermined unit time) from the output signal D0, the selector portion 209 is made to select the output signal D0, the first selection portion 214 is made to select the output signal fed from the first delay element 213, and the second selection portion 216 is made to select the output signal fed directly from the first selection portion 214. To achieve this, the first select signal S0 is turned high, with the other first select signals S1 and S2 turned low, and the second select signals SH and SQ are turned high and low, respectively.

To select as the output pulse signal DOUT the output signal $D0_{3/4}$, which is delayed by ¾ of the period of the internal clock signal ICLK (i.e., 0.75 times the predetermined unit time) from the output signal D0, the selector portion 209 is made to select the output signal D0, the first selection portion 214 is made to select the output signal fed from the first delay element 213, and the second selection portion 216 is made to select the output signal fed from the second delay element 215. To achieve this, the first select signal S0 is turned high, with the other first select signals S1 and S2 turned low, and the second select signals SH and SQ are both turned high.

By controlling the first select signals S0, S1, and S2 and the second select signals SH and SQ in similar manners, it is possible to make the voltage conversion circuit of this embodiment selectively output one of the 12 output signals D0, D0$_{1/4}$, D0$_{1/2}$, D0$_{3/4}$, D1, D1$_{1/4}$, D1$_{1/2}$, D1$_{3/4}$, D2, D2$_{1/4}$, D2$_{1/2}$, or D2$_{3/4}$. That is, this voltage conversion circuit permits the duty ratio of the output pulse signal DOUT to be varied arbitrarily in the range from 1/5 to 1/7.75.

On the basis of formula (2) noted earlier, if it is assumed that the external supply voltage VDD that is supplied to the voltage conversion circuit of this embodiment is 3 V, then the output voltage VINT when the output signal D0 of the basic delay circuit portion 207 is selected as the output pulse signal DOUT is calculated to be 0.6 V Likewise, the output voltage VINT when one of the output signals D0$_{1/4}$ to D2$_{3/4}$ is selected as the output pulse signal DOUT is calculated to be from 0.55 V to 0.39 V. Thus, the variable range of the output voltage VINT of the voltage conversion circuit of this embodiment is from 0.39 V to 0.6 V, with a unit variation step of 19 mV on average.

As described above, in the voltage conversion circuit of this embodiment, a slight modification in the circuit configuration, namely the addition of the second delay circuit 210, makes it possible to increase the number of choices among which the output pulse signal DOUT can be controlled and thereby reduce the unit variation step of the output voltage VINT, without increasing the number of delay elements constituting the additional delay circuit portion 208. This helps greatly increase the accuracy with which the output voltage VINT is varied. Moreover, the reduction achieved in the number of delay elements constituting the additional delay circuit portion 208 helps reduce the number of input terminals of the NOR circuit provided in the reference pulse generator circuit 201. This, too, helps reduce the circuit scale.

Needless to say, adopting the voltage conversion circuit of this embodiment helps reduce the circuit scale and power consumption, with no less advantages than with the voltage conversion circuit of the first embodiment.

Figure 8:
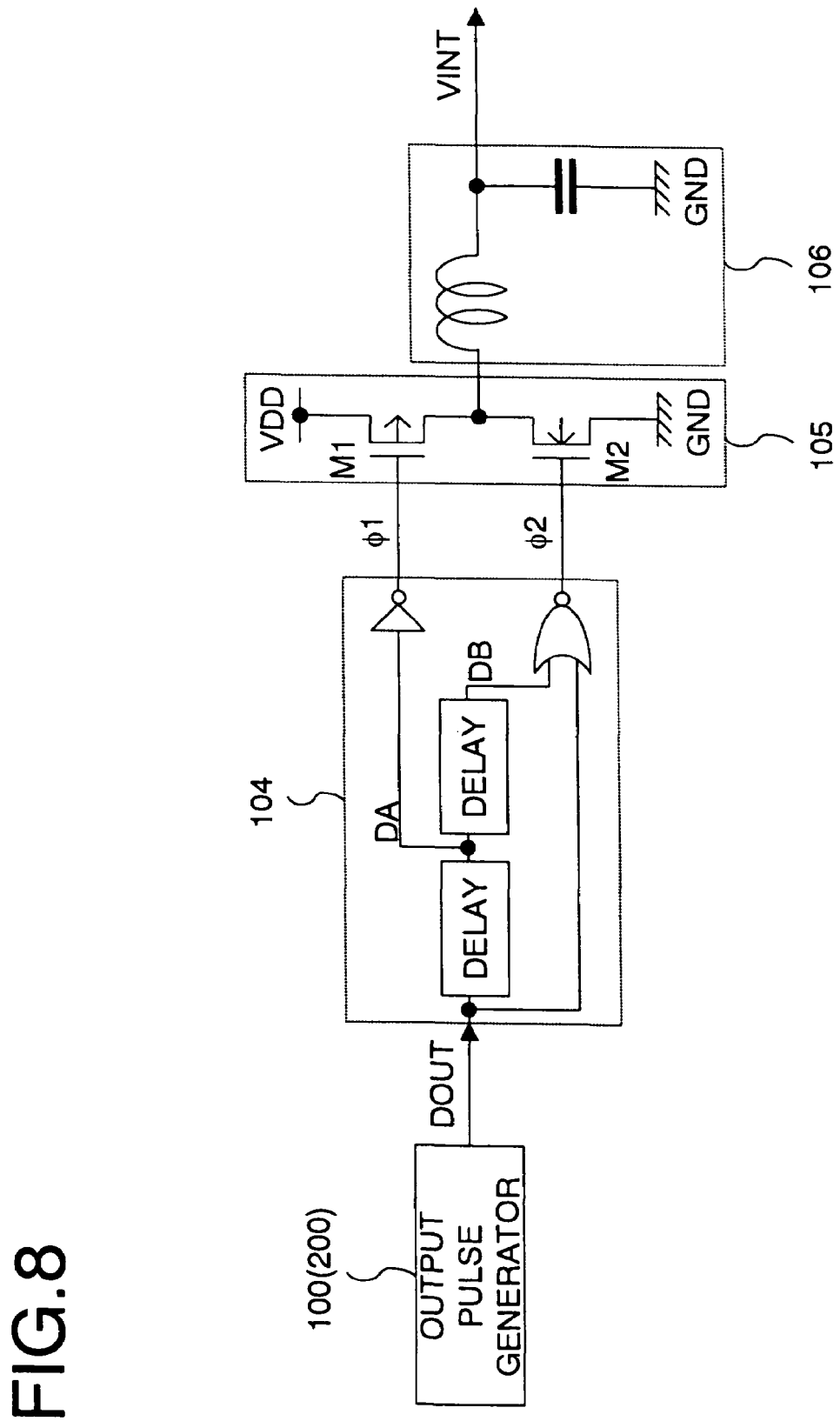
FIG. 8 is a diagram showing an outline of an example of the configuration of the switch timing controller circuit 104.

Next, the internal configuration and operation of the switch timing controller circuit 104 provided in the voltage conversion circuits of the embodiments described above will be described. FIG. 8 is a diagram showing an outline of an example of the configuration of the switch timing controller circuit 104. As shown in this figure, the switch timing controller circuit 104 includes two stages of delay circuits connected in series, an inverter circuit, and a NOR circuit having two input terminals. The two delay circuits produce equal delay times DT.

The output end of the output pulse generator circuit 100 (or 200) is connected to the input end of the first-stage delay circuit and to one input terminal of the NOR circuit. The output end of the first-stage delay circuit is connected to the input end of the next-stage delay circuit and to the input terminal of the inverter circuit. The output end of the next-stage delay circuit is connected to the other input terminal of the NOR circuit. The output terminal of the inverter circuit is connected to the gate of the PMOS transistor M1 provided in the switch circuit 105, and the output terminal of the NOR circuit is connected to the gate of the NMOS transistor M2 provided in the switch circuit 105.

In the switch timing controller circuit 104 configured as described above, the output pulse signal DOUT is delayed by a predetermined time DT by the first-stage delay circuit to generate an output signal Da, the NOT of which is then produced by the inverter circuit generate the first control signal φ1. The output signal Da of the first-stage delay circuit is further delayed by the predetermined time DT by the next-stage delay circuit to generate an output signal Db, and the NOR of this output signal Db and the output pulse signal DOUT fed directly from the output pulse generator circuit 100 (or 200) is then produced by the NOR circuit to generate the second control signal φ2.

Figure 9:
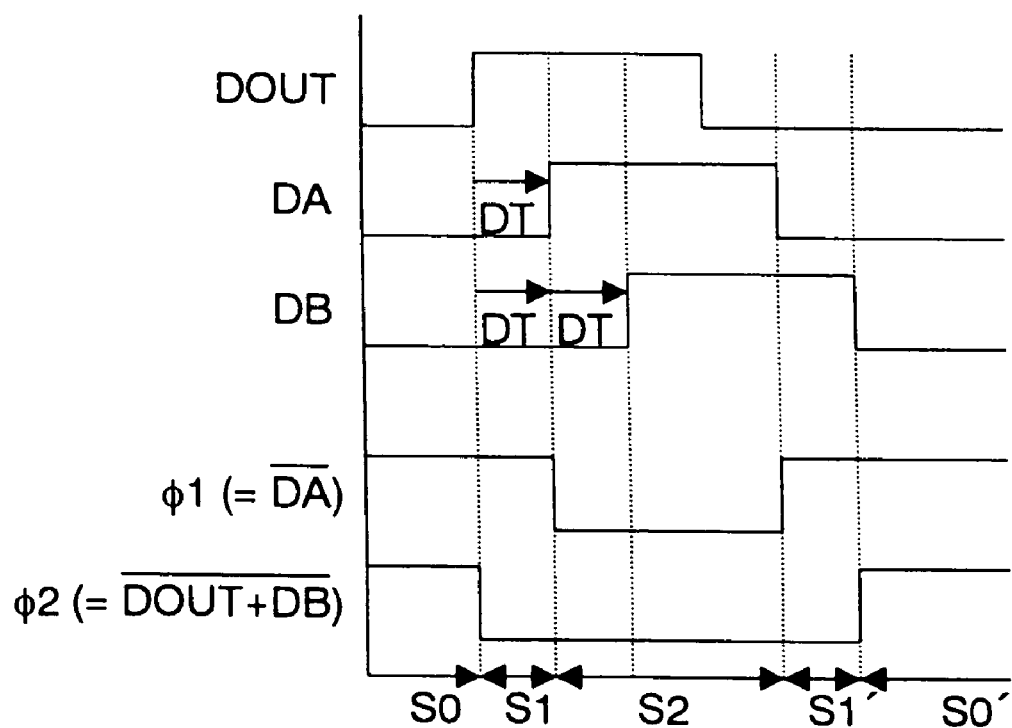
FIG. 9 is a timing chart showing the waveforms of relevant signals observed in the switch timing controller circuit 104.

FIG. 9 is a timing chart showing the waveforms of relevant signals observed in the switch timing controller circuit 104. As will be understood from this figure, in the switch timing controller circuit 104 configured as described above, the time point at which the first control signal φ1 is turned low (i.e., the time point at which the PMOS transistor M1 is turned on) is intentionally delayed from the time point at which the second control signal φ2 is turned low (i.e., the time point at which the NMOS transistor N is turned off). Moreover, the time point at which the second control signal φ2 is turned high (i.e., the time point at which the NMOS transistor M2 is turned on) is intentionally delayed from, the time point at which the first control signal φ1 is turned high (i.e., the time point at which PMOS transistor M1 is turned off).

More specifically, the PMOS transistor M1 is on only during a period S2, and remains off in any other period. On the other hand, the NMOS transistor M2 is on only during periods S0 and S0', and remains off in any other period. Accordingly, in periods S1 and S1', the PMOS and NMOS transistors M1 and M2 are both off, and there exists no period in which the PMOS and NMOS transistors M1 and M2 are both on.

In this way, in controlling the on/off states of the PMOS and NMOS transistors M1 and M2, by first turning off one MOS transistor and then, a predetermined time thereafter, turning on the other MOS transistor, even if a slight unintended delay is produced in the first and second control signals φ1 and φ2 in the process of there generation, it is possible to prevent the PMOS and NMOS transistors M1 and M2 from being turned on simultaneously. This helps prevent a flow-through current from flowing through the switch circuit 105, and thus helps reduce unnecessary power consumption.

Figure 10:
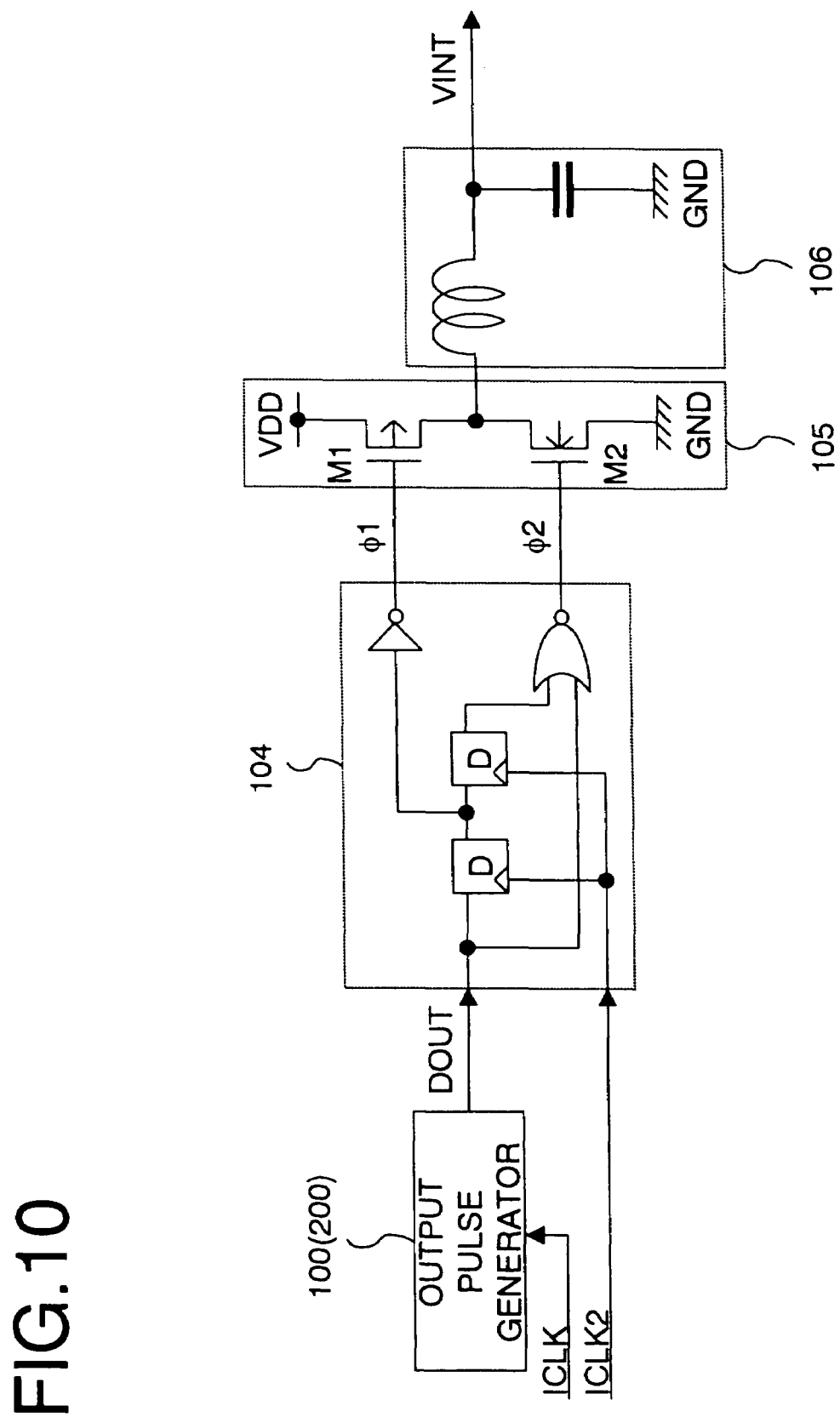
FIG. 10 is a diagram showing an outline of another example of the configuration of the switch timing controller circuit 104.

The switch timing controller circuit 104 can be built with D flip-flop circuits used as its delay circuits, as will be described below. FIG. 10 is a diagram showing an outline of another example of the configuration of the switch timing controller circuit 104. In the switch timing controller circuit 104 shown in this figure, D flip-flop circuits are used as the delay circuits.

The flip-flop circuits receive, at their clock terminals, the internal clock signal ICLK2. The internal clock signal ICLK2 is a double-rate clock signal of the internal clock signal ICLK with which the output pulse generator circuit 100 (or 200) is driven, and thus has twice the frequency of the internal clock signal ICLK.

In the switch timing controller circuit 104 configured as described above, the output pulse signal DOUT, which is synchronous with the internal clock signal ICLK, is delayed by one period of the internal clock signal ICLK2 by the first-stage flip-flop circuit, the NOT of the output signal of which is then produced by the inverter circuit to generate the first control signal φ1. The output signal of the first-stage flip-flop circuit is further delayed by one period of the internal clock signal ICLK2 by the next-stage flip-flop circuit, and the NOR of the output signal therefrom and the output pulse signal DOUT fed directly from the output pulse generator circuit 100 (or 200) is produced by the NOR circuit to generate the second control signal φ2.

Figure 11A:
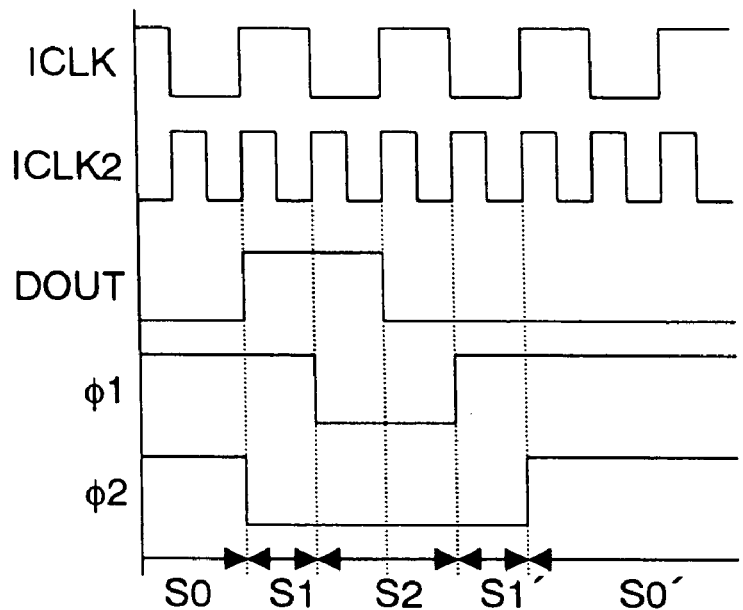
FIGS. 11A and 11B are timing charts showing the waveforms of relevant signals observed in the switch timing controller circuit 104.
Figure 11B:
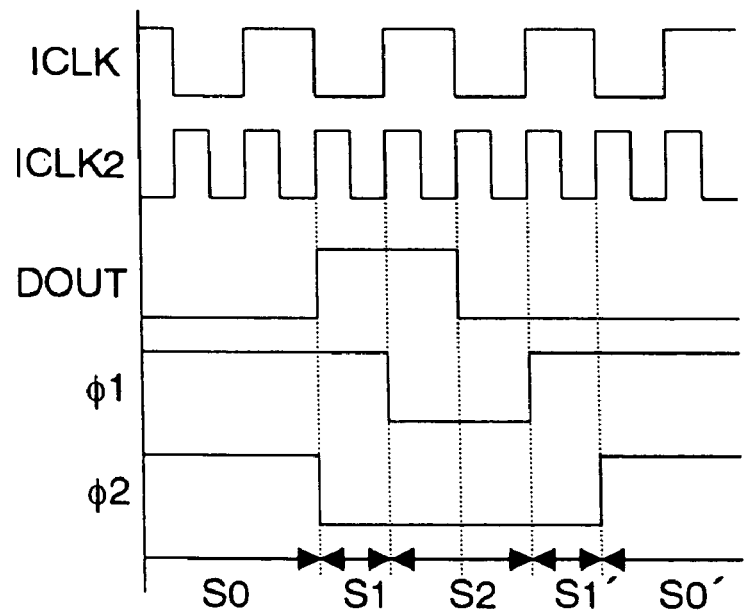

FIGS. 11A and 11B are timing charts showing the waveforms of relevant signals observed in the switch timing controller circuit 104. FIG. 11A shows the case where the output pulse signal DOUT is synchronous with the positive edges of the internal clock signal ICLK. FIG. 11B shows the case where the output pulse signal DOUT is synchronous with the negative edges of the internal clock signal ICLK.

As will be understood from these figures, in the switch timing controller circuit 104 configured as described above, as in the example described previously, the time point at which the first control signal φ1 is turned low is intentionally delayed from the time point at which the second control signal φ2 is turned low. Moreover, the time point at which the second control signal φ2 is turned high is intentionally delayed from the time point at which the first control signal φ1 is turned high. This prevents the PMOS and NMOS transistors M1 and M2 from being turned on simultaneously, and thus helps reduce unnecessary power consumption by the switch circuit 105.

Moreover, by driving the flip-flop circuits, which give delays to the output pulse signal DOUT, with the internal clock signal ICLK2, which is a double-rate clock signal of the internal clock signal ICLK, irrespective of whether the output pulse signal DOUT is synchronous with the positive or negative edges of the internal clock signal ICLK, it is possible to make each of the flip-flop circuits produce a delay time equal to half the period of the internal clock signal ICLK, i.e., to one period of the internal clock signal ICLK2.

In the embodiment described above, the delay circuits that give delays to the output pulse signal DOUT is built with D flip-flop circuits; however, the delay circuits may be built with flip-flop circuits or delay elements of any other type than D flip-flop circuits.

Figure 12:
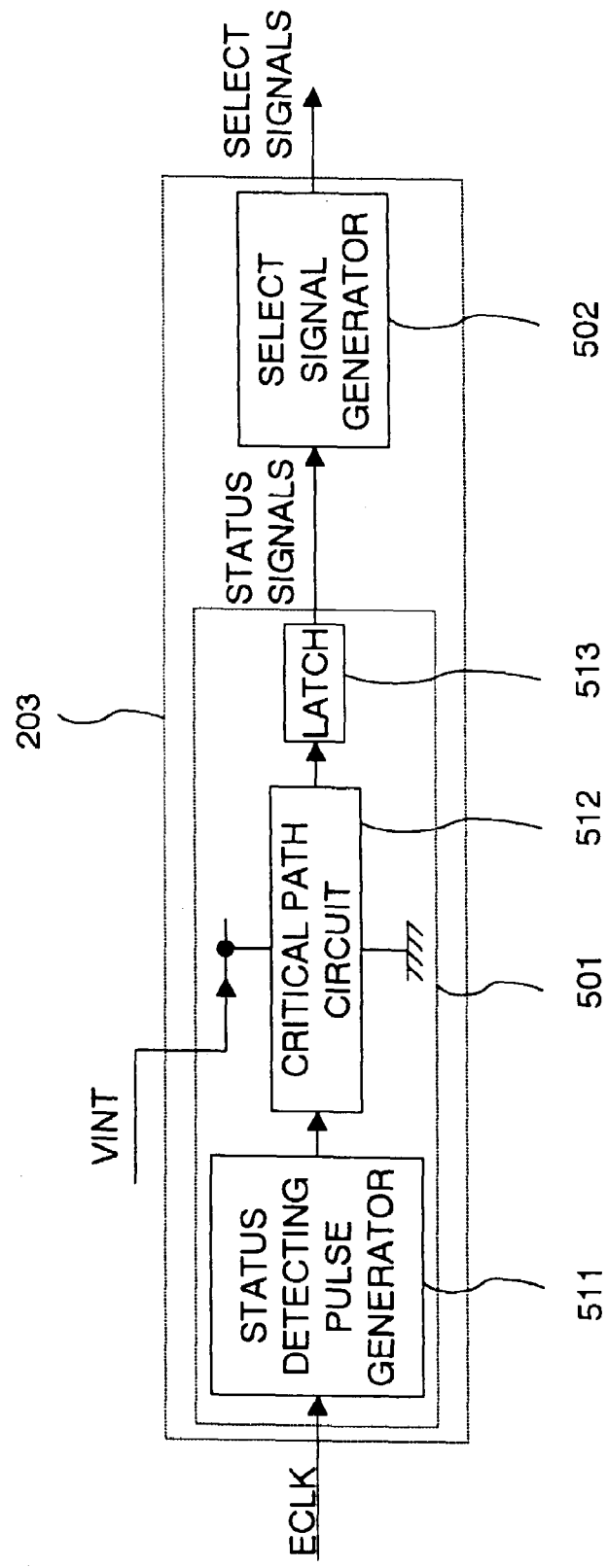
FIG. 12 is a diagram showing an outline of an example of the configuration of the delay time controller circuit 203.

Next, the internal configuration and operation of the delay time controller circuits 103 and 203 provided in the voltage conversion circuits of the embodiments described above will be described. The delay time controller circuits 103 and 203 have quite the same basic configuration, and therefore the following descriptions take up, as their representative, the delay time controller circuit 203 of the second embodiment. FIG. 12 is a diagram showing an outline of an example of the configuration of the delay time controller circuit 203.

As described earlier, the delay time controller circuit 203 is a circuit that feeds select signals to the selector portion 209 of the first delay circuit 202 and the first to n-th selection portions 214, . . . , and 216 of the second delay circuit 210 provided in the output pulse generator circuit 200 in order to set the first and second delay circuits 202 and 210 to produce delay times that yield the desired output voltage VINT. As shown in the figure, the delay time controller circuit 203 includes a replica circuit 501 and a select signal generator circuit 502.

First, the replica circuit 501 will be described. The replica circuit 501 is a circuit that generates an operation status signal that indicates the operation status of the internal circuit that operates from the output voltage VINT, and is composed of an status detecting pulse generator circuit 511, a critical path circuit 512, and a latch circuit 513.

The status detecting pulse generator circuit 511 is a circuit that generates an operation status detection pulse signal RPL that is synchronous with the operation clock signal ECLK of the internal circuit that operates from the output voltage VINT. The operation status detection pulse signal RPL is fed to the critical path circuit 512 provided in the next stage.

The critical path circuit 512 is a circuit that produces a delay equivalent to the delay through the critical path of the internal circuit, i.e., the path circuit that is considered to cause the longest delay to the signal passing therethrough.

To cope with variations originating from the fabrication process and variations in operating conditions, the critical path circuit 512 is fabricated by the same fabrication process as the internal circuit. Moreover, the critical path circuit 512 receives, as a supply voltage, the output voltage VINT of the filter circuit 106. That is, the critical path circuit 512 monitors the drive voltage of the internal circuit, which is the target to which the supply voltage is supplied.

The latch circuit 513 is a circuit that temporarily holds the pulse signal output from the critical path circuit 512, and its output signal is fed, as the operation status signal of the replica circuit 501, to the select signal generator circuit 502 provided in the next stage.

Figure 13:
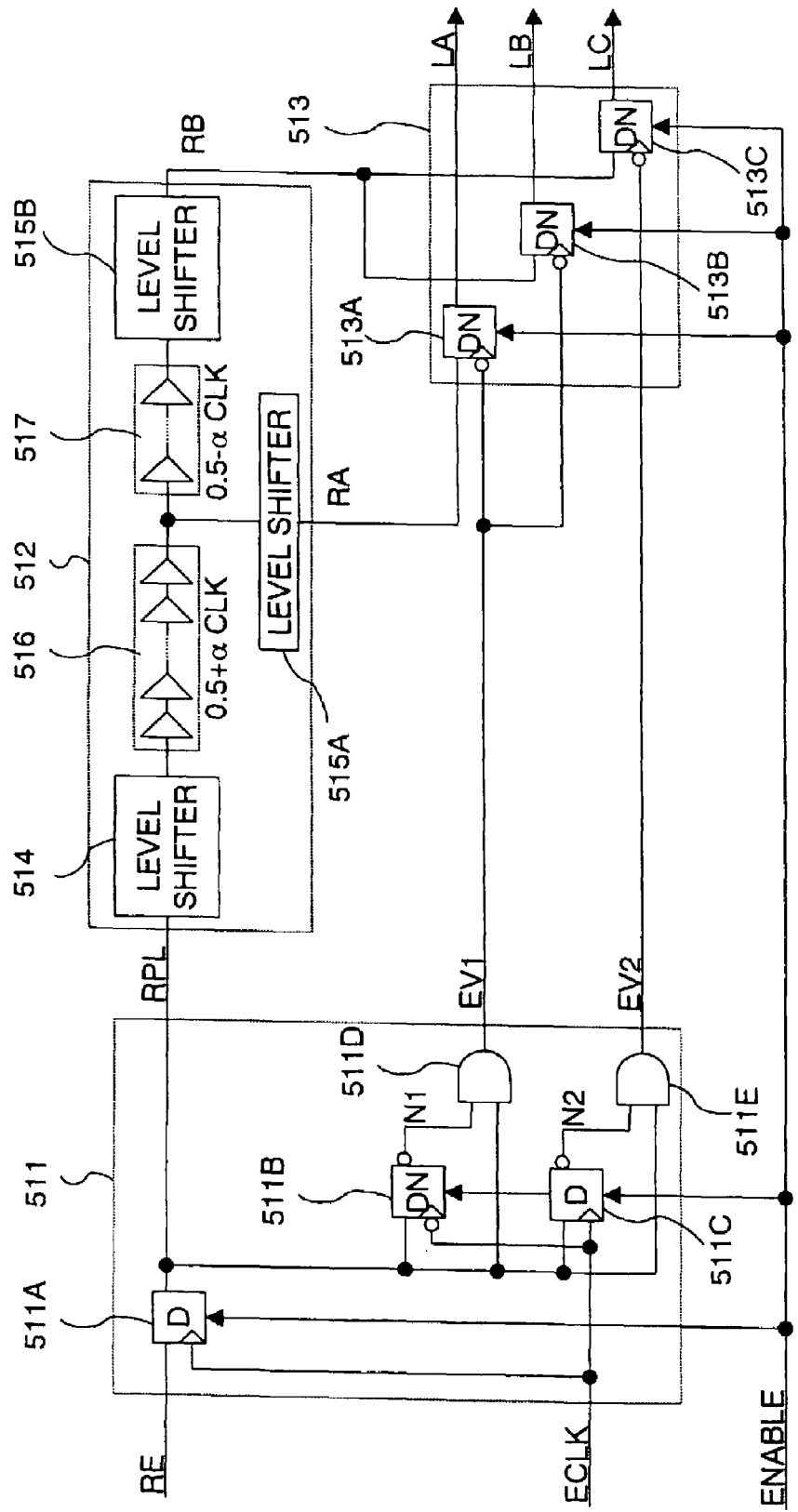
FIG. 13 is a diagram showing an outline of an example of the configuration of the replica circuit 501.

Next, a practical configuration of the replica circuit 501 and its operation will be described. FIG. 13 is a diagram showing an outline of an example of the configuration of the replica circuit 501. First, the internal configuration and operation of the status detecting pulse generator circuit 511 will be described. As shown in this figure, the status detecting pulse generator circuit 511 is composed of flip-flop circuits 511A, 511B, and 511C (hereinafter referred to as the FF 511A, FF 511B, and FF 511C, respectively) and AND circuits 511D and 511E each having two input terminals.

The operation status of the internal circuit that is supplied with the output voltage VINT is best detected immediately before the output selection operation performed by the first and second delay circuits 202 and 210 provided in the output pulse generator circuit 200. Accordingly, in this embodiment, the status detecting pulse generator circuit 511 is so configured as to operate when an enable signal ENABLE fed from outside the replica circuit 501 is on (high). That is, all the FFs 511A, 511B, and 511C operate when the enable signal ENABLE is on (high).

The FF 511A is a D flip-flop circuit that operates by being triggered on the positive edges of the operation clock signal ECLK, and receives, at its data input terminal, a signal RE. Thus, the operation status detection pulse signal RPL output from the FF 511A is a signal delayed by one period of the operation clock signal ECLK from the signal RE. This makes the operation status detection pulse signal RPL synchronous with the operation clock signal ECLK, and thus permits highly accurate detection of the operation status of the internal circuit. The signal RE fed to the FF 511A is a signal that remains on (high) for a predetermined time when the enable signal ENABLE is on (high). This signal RE will be described in detail later.

The output terminal of the FF 511A is connected to the input end of the critical path circuit 512, to the data input terminal of each of the FFs 511B and 511C, and to one input terminal of each of the AND circuits 511D and 511E.

The FF 511B is a DN flip-flop circuit that operates by being triggered on the negative edges of the operation clock signal ECLK, and its output signal N1 is a signal delayed by half the period of the operation clock signal ECLK and inverted relative to the output signal RPL of the FF 511A. The output signal N1 of the FF 511B is fed to the other input terminal of the AND circuit 511D.

The FF 511C is a D flip-flop circuit that operates by being triggered on the positive edges of the operation clock signal ECLK, and its output signal N2 is a signal delayed by one period of the operation clock signal ECLK and inverted relative to the output signal RPL of the FF 511A. The output signal N2 of the FF 511C is fed to the other input terminal of the AND circuit 511E.

The AND circuit 511D produces the AND of the output signal N1 and the operation status detection pulse signal RPL to generate an evaluation pulse signal EV1. The AND circuit 511E produces the AND of the output signal N2 and the operation status detection pulse signal RPL to generate an evaluation pulse signal EV2. These evaluation pulse signals EV1 and EV2 are used as trigger signals to control the operation of the latch circuit 513 provided in the succeeding stage.

Figure 14:
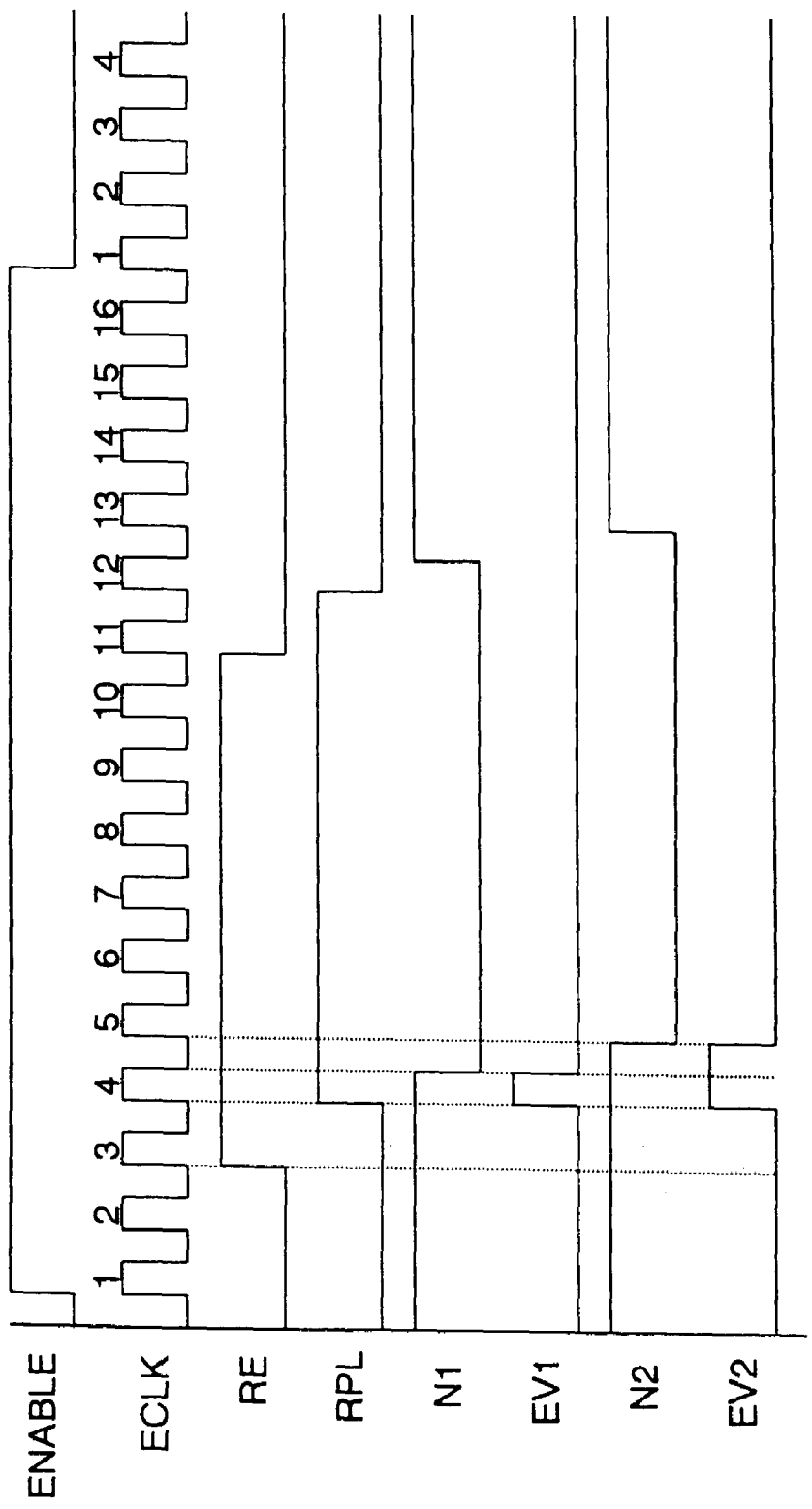
FIG. 14 is a timing chart showing the waveforms of relevant signals observed in the status detecting pulse generator circuit 511.

Next, the operation of the status detecting pulse generator circuit 511 configured as described above will be described. FIG. 14 is a timing chart showing the waveforms of relevant signals observed in the status detecting pulse generator circuit 511. The following descriptions deal with a example in which the enable signal ENABLE remains on (high) for a time corresponding to 16 periods of the operation clock signal ECLK.

As shown in the figure, in this embodiment, the signal RE is a pulse signal that corresponds to a ⅛ division of the enable signal ENABLE, and the operation status detection pulse signal RPL output from the FF 511A is a pulse signal delayed by one period of the enable signal ENABLE from the signal RE. By generating the evaluation pulse signals EV1 and EV2 from this operation status detection pulse signal RPL, it is possible to limit to one the number of pulses that appear as each of the evaluation pulse signals EV1 and EV2 during the period in which the enable signal ENABLE is on, and thereby suppress unnecessary operation of the replica circuit 501.

Moreover, as described above, the output signal N1 of the FF 511B is a pulse signal delayed by half the period of the operation clock signal ECLK and inverted relative to the operation status detection pulse signal RPL, and the output signal N2 of the FF 511C is a pulse signal delayed by one period of the operation clock signal ECLK and inverted relative to the operation status detection pulse signal RPL. Thus, the pulse width of the evaluation pulse signal EV1 generated by the AND circuit 511D corresponds to half the period of the operation clock signal ECLK, and the pulse width of the evaluation pulse signal EV2 generated by the AND circuit 511E corresponds to one period of the evaluation pulse signal EV2.

Next, with reference back to FIG. 13, the internal configuration and operation of the critical path circuit 512 will be described. As described earlier, the critical path circuit 512 is a circuit that is driven with the output voltage VINT fed from the filter circuit 106, and therefore, within the critical path circuit 512, the high level is equal to the output voltage VINT. Therefore, to achieve agreement of the voltage levels of the signals exchanged between the critical path circuit 512, on one hand, and the status detecting pulse generator circuit 511 and latch circuit 513, which are driven with the external supply voltage VDD, on the other hand, the critical path circuit 512 has a step-down level shifter 514 provided in the input stage thereof, and has step-up level shifters 515A and 515B provided in the output stage thereof.

The replica circuit 501 shown in the figure is a circuit that monitors whether or not the critical path circuit 512 provided within it can output a pulse signal within a predetermined time (within one period of the operation clock signal ECLK with which the internal circuit is driven) and that then evaluates the operation status of the internal circuit as one of the following four states: an "excessively high-rate state (hereinafter referred to as the FAST state)," an "operable state (hereinafter referred to as the OK state)," a "dangerous state (hereinafter referred to as the WARN state)," and an "inoperable state (hereinafter referred to as the NG state)."

To achieve distinction among the four states above, the critical path circuit 512 is divided into a first-half critical path circuit 516 and a latter-half critical path circuit 517.

Here, assuming that the delay time through the critical path circuit 512 as a whole is 1, the first-half and latter-half critical path circuits 516 and 517 are so configured as to produce delay times of 0.5+α and 0.5−α, respectively. That is, the critical path circuit 512 is so divided that the delay time through the first-half critical path circuit 516 is slightly longer than the delay time through the latter-half critical path circuit 517.

The critical path circuit 512 is suitably configured as an inverter chain having a plurality of inverter circuits connected in series. Instead of inverter circuits, it is also possible to use NAND or NOR circuits.

The operation status detection pulse signal RPL output from the status detecting pulse generator circuit 511 is fed through the step-down level shifter 514 to the first-half critical path circuit 516. The output signal of the first-half critical path circuit 516 is fed to the latter-half critical path circuit 517, and is also formed, through the step-up level shifter 515A, into an output signal RA, which is then fed to the latch circuit 513. The output signal of the latter-half critical path circuit 517 is formed, through the step-up level shifter 515B, into an output signal RB, which is then fed to the latch circuit 513.

Next, the internal configuration and operation of the latch circuit 513 will be described. The latch circuit 513 includes DN flip-flop circuits 513A and 513B (hereinafter referred to as the FF 513A and FF 513B) that are triggered on the negative edges of the evaluation pulse signal EV1 fed from the status detecting pulse generator circuit 511, and a DN flip-flop circuit 513C (hereinafter referred to as the FF 513C) that is triggered on the negative edges of the evaluation pulse signal EV2. The FF 513A receives, at its data input terminal, the output signal RA from the step-up level shifter 515A, and the FFs 513B and 513C receive, at their data input terminals, the output signal RB from the step-up level shifter 515B.

Accordingly, the output signal RA is latched on the negative edges of the evaluation pulse signal EV1 by the FF 513A and is thereby formed into a signal LA, the output signal RB is latched on the negative edges of the evaluation pulse signal EV1 by the FF 513B and is thereby formed into a signal LB, and the output signal RB is latched on the negative edges of the evaluation pulse signal EV2 by the FF 513C and is thereby formed into a signal LC. The thus formed signals LA, LB, and LC are used as the operation status signals LA, LB, and LC eventually fed from the replica circuit 501 to the select signal generator circuit 502 provided in the next stage.

The operation status of the internal circuit to which the output voltage VINT is supplied is best detected immediately before the output selection operation performed by the first and second delay circuits 202 and 210 provided in the output pulse generator circuit 200. Accordingly, in this embodiment, the latch circuit 513 is so configured as to operate when the enable signal ENABLE fed from outside the replica circuit 501 is on (high). That is, all the FFs 513A, 513B, and 513C operate when the enable signal ENABLE is on (high).

Figure 15:
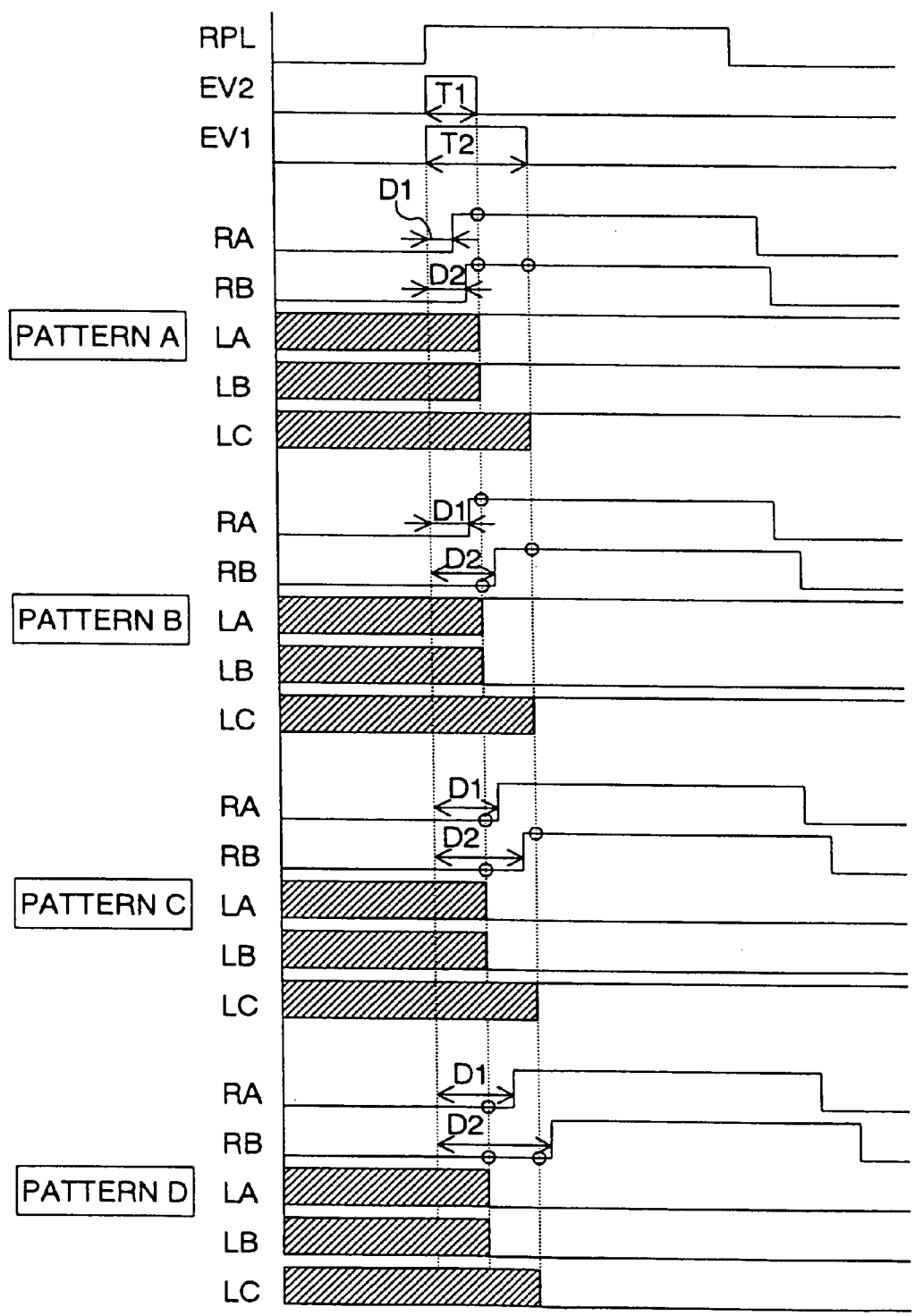
FIG. 15 is a timing chart showing the waveforms of relevant signals observed in the replica circuit 501.

Now, the operation of the replica circuit 501 configured as described above will be described. FIG. 15 is a timing chart showing the waveforms of relevant signals observed n the replica circuit 501. In the following descriptions, the pulse width of the evaluation pulse signal EV1 (i.e., half the period of the operation clock signal ECLK) is called the first predetermined operation time T1, the pulse width of the evaluation pulse signal EV2 (one period of the operation clock signal ECLK) is called the second predetermined operation time T2, the delay time through the first-half critical path circuit 516 is called the first operation time D1, and the delay time through the critical path circuit 512 as a whole is-called the second operation time D2.

In the figure, pattern A shows a case where the output signal RA is latched high by FF 513A and the output signal RB is latched high by both the FFs 513B and 513C, i.e., a case where the second operation time D2 is shorter than the first predetermined operation time T1. In this case, the critical path circuit 512 as a whole is operating with a delay time shorter than half the period of the operation clock signal ECLK, and therefore the internal circuit that is being driven with the output voltage VINT is considered to be operating at a rate higher than is sufficient. Accordingly, the state in which the operation status signals LA, LB, and LC from the replica circuit 501 are all high is judged to be the FAST state.

In the figure, pattern B shows a case where the output signal RA is latched high by FF 513A and the output signal RB is latched low and high by the FFs 513B and 513C, respectively, i.e., a case where the first operation time D1 is shorter than the first predetermined operation time T1 and the second operation time D2 is longer than the first predetermined operation time T1 but shorter than the second predetermined operation time T2. In this case, the first-half critical path circuit 516 is operating with a delay time shorter than half the period of the operation clock signal ECLK, and the critical path circuit 512 as a whole is operating with a delay time longer than half the period of the operation clock signal ECLK but shorter than one period thereof In this state, the internal circuit that is being driven with the output voltage VINT is considered to be operating at an appropriate rate. Accordingly, the state in which the operation status signals LA, LB, and LC from the replica circuit 501 are high, low, and high, respectively, is judged to be the OK state.

In the figure, pattern C shows a case where the output signal RA is latched low by FF 513A and the output signal RB is latched low and high by the FFs 513B and 513C, respectively, i.e., a case where the first operation time D1 is longer than the first predetermined operation time T1 but the second operation time D2 is shorter than the second predetermined operation time T2. In this case, the first-half critical, path circuit 516 is operating with a delay time not shorter than half the period of the operation clock signal ECLK, but the critical path circuit 512 as a whole is operating with a delay time shorter than one period of the operation clock signal ECLK. In this state, the internal circuit that is being driven with the output voltage VINT is considered to be operating with little margin in its operation rate and thus highly likely to stop operating normally even with a slight variation in ambient conditions or the like. Accordingly, the state in which the operation status signals LA, LB, and LC from the replica circuit 501 are low, low, and high, respectively, is judged to be the WARN state.

In the figure, pattern D shows a case where the output signal RA is latched low by FF 513A and the output signal RB is latched low by both the FFs 513B and 513C, i.e., a case where the second operation time D2 is longer than the second predetermined operation time T2. In this case, the critical path circuit 512 as a whole is operating with a delay time longer than one period of the operation clock signal ECLK, and therefore the internal circuit that is being driven with the output voltage VINT is considered to be highly unlikely to operate normally. Accordingly, the state in which the operation status signals LA, LB, and LC from the replica circuit 501 are all low is judged to be the NG state.

As described above, different combinations of the operation status signals LA, LB, and LC from the replica circuit 501 represent four different states thereof. FIG. 16 is a table showing the relationship between the operation status signals LA, LB, and LC in the replica circuit 501 and the operation status of the internal circuit. By classifying the operation status of the critical path circuit 512 into four different states (FAST, OK, WARN, and NG) in this way, it is possible to finely monitor the operation status of the internal circuit that is driven with the output voltage VINT. This makes it possible to appropriately cope with any variations originating from the fabrication process and variations in ambient conditions and thereby supply the optimum output voltage VINT. This contributes to reduction of the power consumption of the integrated circuit as a whole.

Any combination of the operation status signals LA, LB, and LC other than those shown in FIG. 15 (for example, when the operation status signals LA, LB, and LC are low, high, and low, respectively) is considered to indicate a high likeliness of the critical path circuit 512 itself not operating normally. Accordingly, any state in which the combination of the operation status signals LA, LB, and LC is any other than those shown in FIG. 15 is judged to be an (NG) state. By detecting the operation status in this way, it is possible to operate the internal circuit more stably. Moreover, it is possible to detect a fault or the like of the replica circuit 501 at an early stage and take corrective measures quickly.

Next, the select signal generator circuit 502 will be described. The select signal generator circuit 502 is a circuit that generates, on the basis of the operation status signals LA, LB, and LC fed from the replica circuit 501, select signals that are to be fed to the selector portion 209 of the first delay circuit 202 and the first to n-th selection portions 214, . . . , 216 of the second delay circuit 210 provided in the output pulse generator circuit 200.

For example, when the operation status signals LA, LB, and LC indicate the FAST state, the select signal generator circuit 502 generates select signals that cause the output voltage VINT to be made one step lower than it currently is, i.e., that cause the delay time through the first and second delay circuits 202 and 210 to be made one step longer than it currently is. When the operation status signals LA, LB, and LC indicate the OK state, the select signal generator circuit 502 generates select signals that cause the output voltage VINT to be maintained as it currently is, i.e., that cause the delay time to be maintained as it currently is. When the operation status signals LA, LB, and LC indicate the WARN or NG state, the select signal generator circuit 502 generates select signals that cause the output voltage VINT to be made one step higher than it currently is, i.e., that cause the delay time to be made one step shorter than it currently is.

In the voltage conversion circuits of the embodiments described above, the output voltage VINT is varied by increasing or decreasing the delay time produced by the first or second delay circuit 202 or 210. Here, if the variation step of the output voltage VINT (i.e., the variation step of the delay time) is too great, making the delay time only one step longer or shorter may cause the OK or WARN state to be completely skipped over. Therefore, the variation step needs to be as small as possible.

On the other hand, when the variation step of the output voltage VINT is sufficiently small, it is likely that, within the range of the OK or WARN state, there exist a plurality of choices of voltages among which one can be selected as the output voltage VINT. In this case, to stabilize the operation of the internal circuit driven with the output voltage VINT and to minimize its power consumption, it is advisable to select the lowest among the plurality of choices of voltages that achieve the OK state.

Accordingly, in this embodiment, even when the operation status signals LA, LB, and LC fed from the replica circuit 501 indicate the OK state, the select signal generator circuit 502 still judges whether or not it is possible to further lower the output voltage VINT, i.e., whether or not it is possible to further lengthen the delay time, in order to find the minimum output voltage VINT that achieves the OK state.

Figure 17:
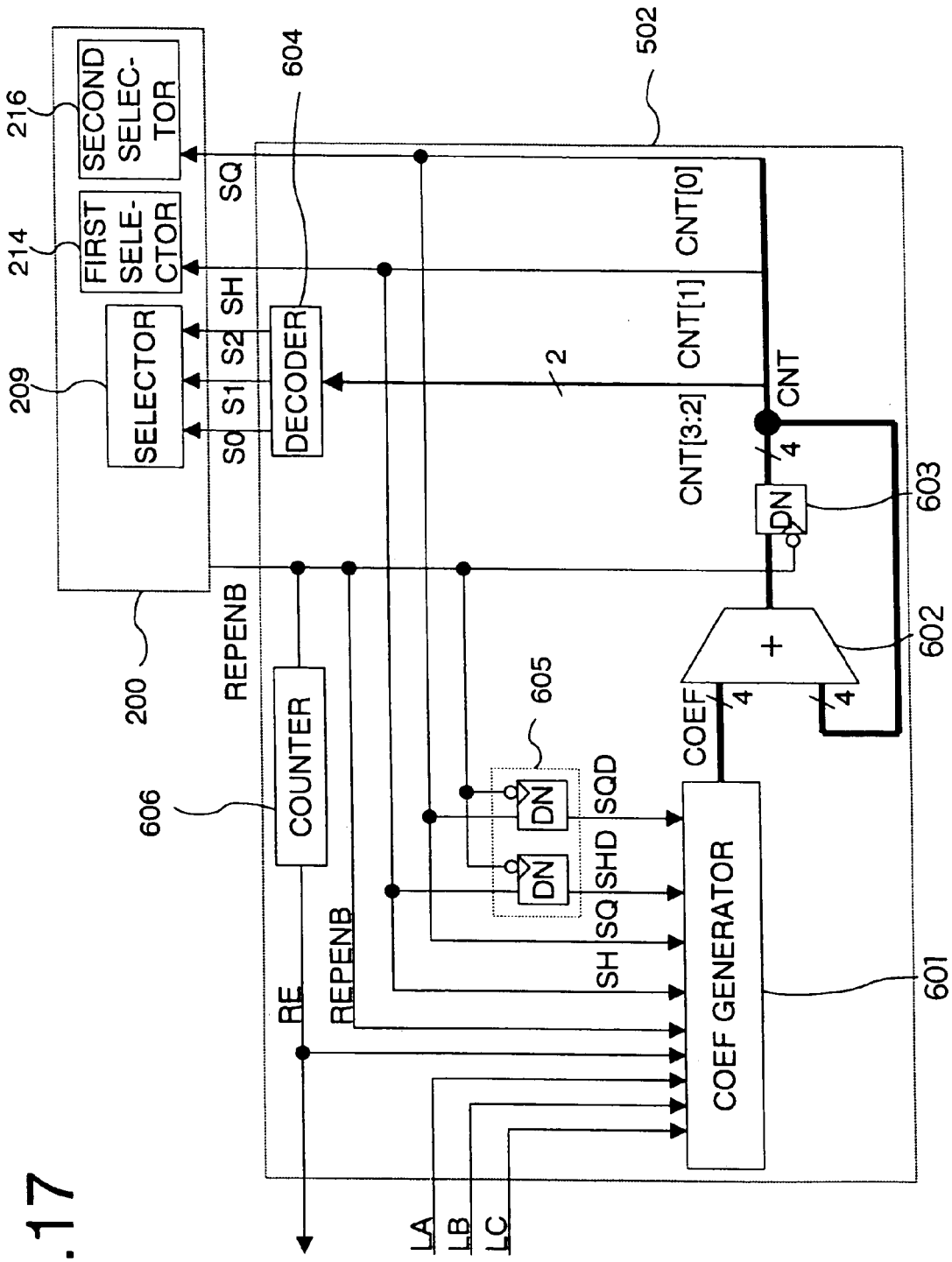
FIG. 17 is a diagram showing an outline of an example of the configuration of the select signal generator circuit 502.

A practical example of the select signal generator circuit 502 configured to operate in the manner described above is shown in FIG. 17. FIG. 17 is a diagram showing an outline of an example of the configuration of the select signal generator circuit 502. As shown in this figure, the select signal generator circuit 502 includes a coefficient generator circuit 601, a four-bit adder 602, a four-bit register 603, a decoder circuit 604, a two-bit register 605, and a counter circuit 606.

The coefficient generator circuit 601 is a circuit that generates a four-bit signal COEF on the basis of the operation status signals LA, LB, and LC fed from the replica circuit 501, the second select signals SH ad SQ, and inverted versions SHD and SQD of the second select signals SH and SQ. The coefficient generator circuit 601 receives, in addition to the signals mentioned above, a signal REPENB output from the output pulse generator circuit 200 and the signal RE output from the counter circuit 606.

The signal REPENB mentioned above is a periodic signal that rises immediately before the output selection operation performed by the first and second delay circuits 202 and 210 provided in the output pulse generator circuit 200. Used as the signal REPENB is, for example, the output signal DM1 (see FIG. 6) of the basic delay circuit portion 207 provided in the first delay circuit 202. The signal RE corresponds to a division signal of the signal REPENB.

The four-bit adder 602 is a circuit that calculates the value representing the new select signal on the basis of the four-bit signal COEF generated by the coefficient generator circuit 601 and the output signal CNT of the four-bit register 603, in which the value representing the previous select signal is stored,.

The four-bit register 603 is a circuit that temporarily holds the output signal of the four-bit adder 602, and is composed of four DN flip-flop circuits (not shown) that operate by being triggered on the negative edges of the signal REPENB.

In this embodiment, when the voltage conversion circuit is started up, the DN flip-flop circuits constituting the four-bit register 603 are, first, all reset to low by a reset signal (not shown). At this time, the first select signal S0 output from the decoder circuit 604 turns high, and the other first select signals S1 and S2 both turn low. The second select signals SH and SQ both turn low.

That is, in this embodiment, when the voltage conversion circuit is started up, as the output pulse signal DOUT of the output pulse generator circuit 200, the output signal D0 is selected, which causes the first and second delay circuits 202 and 210 to produce their minimum delay time. Thus, the output voltage VINT is at the upper limit of its variable range, and therefore the internal circuit supplied with the output voltage VINT can surely operate even at start-up.

The decoder circuit 604 is a circuit that generates the first select signals S0, S1, and S2 by decoding the highest two bits (CNT[3:2]) of the output signal CNT of the four-bit register 603, and that then feeds the first select signals S0, S1, and S2 to the selector portion 209 of the output pulse generator circuit 200. Here, the decoder circuit 604 converts the two-bit signals ("00" to "10"), representing "0" to "2" in decimal notation, held in the four-bit register 603 into the corresponding three-bit signals ("100" to "001") corresponding to the first select signals S0, S1, and S2, respectively.

On the other hand, as the second select signal SH, the second lowest bit (CNT[1]) of the output signal CNT of the four-bit register can be used intact, and, as the second select signal SQ, the lowest bit (CNT[0]) of the output signal CNT can be used intact. These second select signals SH and SQ are fed to the first and second selection portions 214 and 216, respectively, provided in the second delay circuit 210 of the output pulse generator circuit 200, and are also fed to the coefficient generator circuit 601 and to the two-bit register 605.

The two-bit register 605 is a circuit that temporarily holds the second select signals SH and SQ, and is composed of two DN flip-flop circuits that operate by being triggered on the negative edges of the signal REPENB. These flip-flop circuits feed delayed versions SHD and SQD of the second select signals SH and SQ, respectively, to the coefficient generator circuit 601.

The counter circuit 606, by counting the signal REPENB, generates the signal RE, which corresponds to a division signal of the signal REPENB, and feeds the signal RE to the replica circuit 501 and to the coefficient generator circuit 601.

Figure 18:
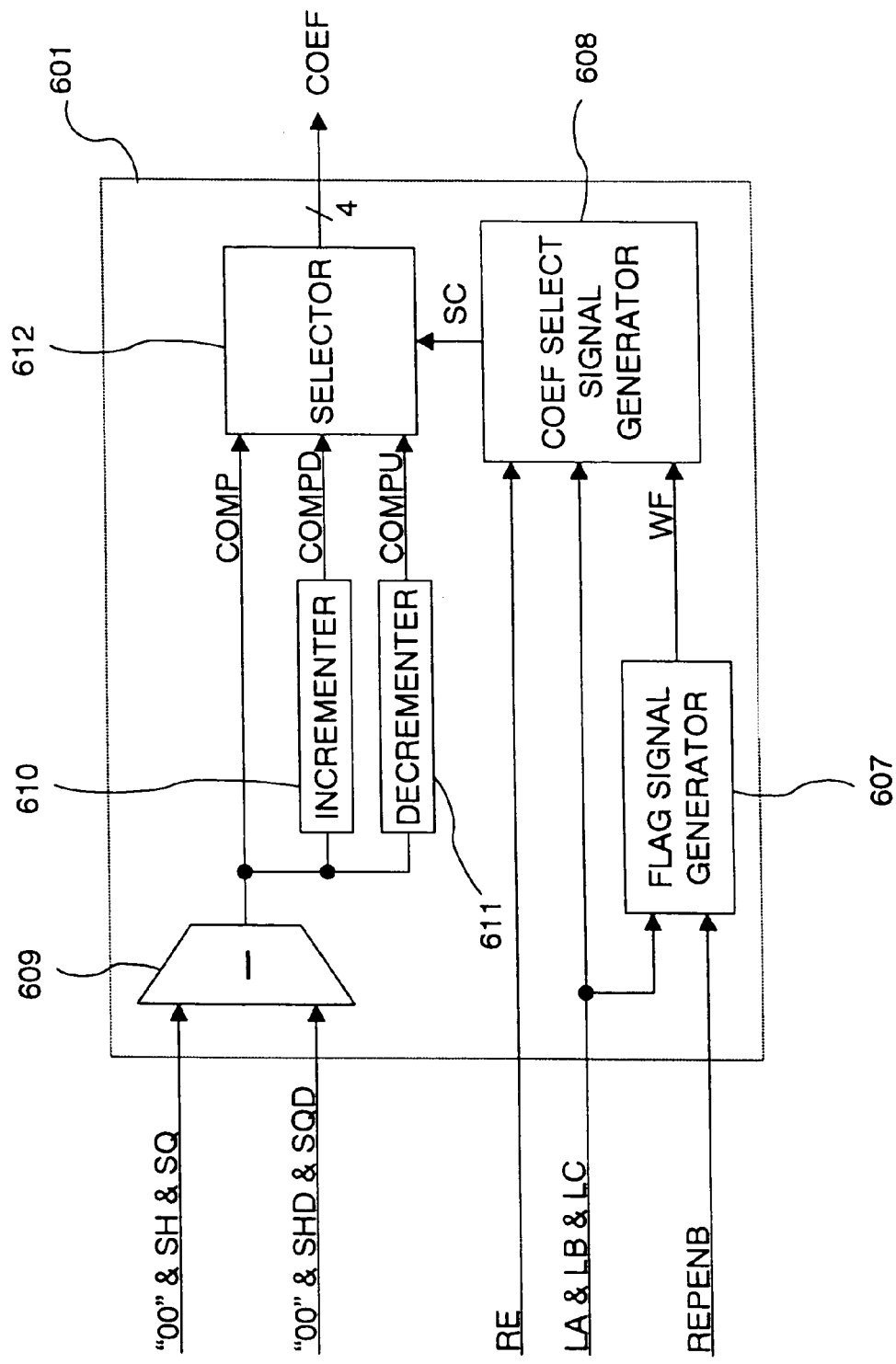
FIG. 18 is a diagram showing an outline of an example of the configuration of the coefficient generator circuit 601.

Next, the internal configuration and operation of the coefficient generator circuit 601 will be described. FIG. 18 is a diagram showing an outline of an example of the configuration of the coefficient generator circuit 601. As shown in this figure, the coefficient generator circuit 601 includes a flag signal generator circuit 607, a coefficient select signal generator circuit 608, a four-bit subtractor 609, an incrementer 610, a decrementer 611, and a selector 612.

The flag signal generator circuit 607 is a circuit that generates a flag signal WF on the basis of the operation status signals LA, LB, and LC fed from the replica circuit 501. When the operation status signals LA, LB, and LC indicate the WARN state, the flag signal generator circuit 607 turns the flag signal WF enabled (high), and, when the operation status signals LA, LB, and LC indicate the FAST state, the flag signal generator circuit 607 turns the flag signal WF disabled (low). When the operation status signals LA, LB, and LC indicate any other state than the WARN and FAST states, the flag signal generator circuit 607 maintains the flag signal WF as it currently is. The flag signal WF is determined in synchronism with the signal REPENB fed from the output pulse generator circuit 200.

FIG. 19 shows the truth table of the logic circuit implemented in the flag signal generator circuit 607. Implementing the truth table shown in this figure in the form of a logic circuit in the flag signal generator circuit 607 makes it possible to generate the flag signal WF in the manner described above. In the figure, WF0 represents the previously determined value of the flag signal WF, and thus indicates that the current value of the flag signal WF is maintained.

The coefficient select signal generator circuit 608 is a circuit that generates a coefficient select signal SC, which is used to control the coefficient selection operation performed by the selector 612, on the basis of the operation status signals LA, LB, and LC fed from the replica circuit 501 and the flag signal WF fed from the flag signal generator circuit 607. The coefficient select signal SC is determined in synchronism with the signal RE fed from the counter circuit 606.

On the basis of the coefficient select signal SC, the selector 612 selects one of a coefficient COMP that causes the output voltage VINT to be maintained as it currently is, a coefficient COMPD that causes the output voltage VINT to be made one step lower than it currently is, and a coefficient COMPU that causes the output voltage VINT to be made one step higher than it currently is, and then feeds the selected coefficient, as the four-bit signal COEF, to the four-bit adder 602.

When the coefficient COMP is selected as the four-bit signal COEF, the delay time through the first and second delay circuits 202 and 210 provided in the output pulse generator circuit 200 is maintained as it currently is, and accordingly the output voltage VINT is maintained as it currently is. When the coefficient COMPD is selected as the four-bit signal COEF, the delay time is made one step longer than it currently is, and accordingly the output voltage VINT is made one step lower than it currently is. When the coefficient COMPU is selected as the four-bit signal COEF, the delay time is made one step shorter than it currently is, and accordingly the output voltage VINT is made one step higher than it currently is.

Now, the operation of the coefficient select signal generator circuit 608 and the selector 612 will be described in more detail. When the operation status signals LA, LB, and LC fed from the replica circuit 501 indicate the WARN, NG, or (NG) state, irrespective of the value of the flag signal WF, the coefficient select signal generator circuit 608 generates a coefficient select signal SC that causes the output voltage VINT to be made one step higher than it currently is. On the basis of this coefficient select signal SC, the selector 612 selects the coefficient COMPU.

When the operation status signals LA, LB, and LC indicate the OK state and in addition the flag signal WF is disabled (low), the coefficient select signal generator circuit 608 generates a coefficient select signal SC that causes the output voltage VINT to be made one step lower than it currently is. On the basis of this coefficient select signal SC, the selector 612 selects the coefficient COMPD.

When the operation status signals LA, LB, and LC indicate the OK state and in addition the flag signal WF is enabled (high), the coefficient select signal generator circuit 608 generates a coefficient select signal SC that causes the output voltage VINT to be maintained as it currently is. On the basis of this coefficient select signal SC, the selector 612 selects the coefficient COMP.

When the operation status signals LA, LB, and LC indicate the FAST state, irrespective of the value of the flag signal WF, the coefficient select signal generator circuit 608 generates a coefficient select signal SC that causes the output voltage VINT to be made one step lower than it currently is. On the basis of this coefficient select signal SC, the selector 612 selects the coefficient COMPD.

FIG. 20 shows the truth table of the logic circuit implemented in the coefficient select signal generator circuit 608. Implementing the truth table shown in this figure in the form of a logic circuit in the coefficient select signal generator circuit 608 makes it possible to generate the coefficient select signal SC in the manner described above.

Next, practical examples of how the flag signal generator circuit 607 and the coefficient select signal generator circuit 608 control the output voltage VINT will be described.

Now, consider a case where the output voltage VINT of the voltage conversion circuit is so low that the replica circuit 501 indicates the NG state. In this case, irrespective of the value of the flag signal WF, the coefficient select signal generator circuit 608 generates a coefficient select signal SC that causes the output voltage VINT to be made one step higher than it currently is. This permits the output voltage VINT to be raised gradually, and accordingly the operation status indicted by the replica circuit 501 changes from the NG to WARN, and then to OK state. Here, when the OK state is reached, the flag signal WF is enabled (high), because the OK state is achieved by way of the WARN state. Accordingly, as soon as the OK state is reached, the coefficient select signal generator circuit 608 generates a coefficient select signal SC that causes the output voltage VINT to be maintained as it currently is, and thus the output voltage VINT is no longer raised unnecessarily.

Next, consider a case where the output voltage VINT of the voltage conversion circuit is so high that the replica circuit 501 indicates the FAST state. Here, the flag signal WF is disabled (low). In this case, irrespective of the value of the flag signal WF, the coefficient select signal generator circuit 608 generates a coefficient select signal SC that causes the output voltage VINT to be made one step lower than it currently is. This permits the output voltage VINT to be lowered gradually, and accordingly the operation status indicted by the replica circuit 501 changes from the FAST to OK state. Here, when the OK state is reached, the flag signal WF is still disabled (low), because the OK state is achieved not by way of the WARN state. Accordingly, even after the OK state is reached, the output voltage VINT is further lowered, until the operation state changes from the OK to WARN state.

As described above, as soon as the WARN state is reached, the coefficient select signal generator circuit 608 generates a coefficient select signal SC that causes the output voltage VINT to be made one step higher than it currently is. Accordingly, the operation status indicated by the replica circuit 501 changes back to the OK state. Here, when the OK state is reached, the flag signal WF is enabled (high), because the OK state is achieved by way of the WARN state. Accordingly, as soon as the OK state is reached, the coefficient select signal generator circuit 608 generates a coefficient select signal SC that causes the output voltage VINT to be maintained as it currently is, and thus the output voltage VINT is no longer raised unnecessarily.

By controlling the output voltage VINT in this way, it is possible to select the lowest among a plurality of choices of output voltages VINT that achieve the OK state. Thus, it is possible to stabilize the operation of the internal circuit driven with the output voltage VINT while minimizing the power consumption thereof.

Incidentally, in a configuration in which no judgment is made on the basis of the flag signal WF so that the output voltage VINT is kept lowered in the OK state, the operation status indicated by the replica circuit 501 continues to change between the WARN and OK states. This causes the output voltage VINT to be raised and lowered incessantly, and thus may lead to unstable operation of the internal circuit.

Next, the coefficients COMP, COMPD, and COMPU generated by the four-bit subtractor 609, incrementer 610, and decrementer 611 will be described. As describe earlier, these coefficients COMP, COMPD, and COMPU are used to maintain the delay time through the first and second delay circuits 202 and 210 provided in the output pulse generator circuit 200 as it currently is and to make the delay time longer or shorter one step at a time.

The incrementer 610 generates the coefficient COMPD by adding 1 to the value of the coefficient COMP fed from the four-bit subtractor 609, and the decrementer 611 generates the coefficient COMPU by subtracting 1 from the value of the coefficient COMP fed from the four-bit subtractor 609. As described earlier, the coefficient COMPD is selected as the four-bit signal COEF to make the output voltage VINT one step lower than it currently is, and the coefficient COMPU is selected as the four-bit signal COEF to make the output voltage VINT one step higher than it currently is.

By contrast, to maintain the delay time through the first and second delay circuits 202 and 210 provided in the output pulse generator circuit 200 as it currently is, the coefficient COMP fed from the four-bit subtractor 609 is selected by the selector 612. Here, however, to keep constant the pulse period of the output pulse signal DOUT fed from the output pulse generator circuit 200, the coefficient COMP needs to be corrected in a predetermined manner.

FIGS. 21A and 21B are diagrams showing an example of how the coefficient COMP is corrected. FIG. 21A is a timing chart showing the internal clock signals ICLK and ICLK2 and the output pulse signals of the first and second delay circuits 202 and 210. This figure deals with a case where the pulse period of the output pulse signal DOUT output from the second delay circuit 210 corresponds to 5.25 clocks of the internal clock signal ICLK. FIG. 21B illustrates how the four-bit signal COEF (i.e., the coefficient COMP) is calculated, and shows the four-bit signal COEF, the signal CNT, and a signal CNT0 in binary notation (for example, (0000)b). In the figure, the signal CNT0 represents the value of the signal CNT as determined one period before.

First, the state (1) shown in the figures will be described. If it is assumed that the output signal D0 (not shown) of the first delay circuit 202 was selected intact as the output pulse signal DOUT one period previous to the state (1) shown in the figures, the signal CNT0 in the state (1) is (0000)b. Here, to insert a delay corresponding to 5.25 clocks of the internal clock signal ICLK between the output pulse signal DOUT (D0) one period before and the output pulse signal DOUT that is about to be output, the delayed pulse signal $D0_{1/4}$, which is delayed by 0.25 clocks from the output signal D0 of the first delay circuit 202, needs to be selected as the output pulse signal DOUT. That is, by making the four-bit signal COEF equal to (0001)b, the signal CNT output from the four-bit adder 602 is made equal to (0001)b.

Next, the state (2) shown in the figures will be described. In the state (1), the delayed pulse signal $D0_{1/4}$ was selected as the output pulse signal DOUT, and therefore, in the state (2), the signal CNT0 is equal to (0001)b. Here, to insert a delay corresponding to 5.25 clocks of the internal clock signal ICLK between the output pulse signal DOUT ($D0_{1/4}$) one period before and the output pulse signal DOUT that is about to be output, the delayed pulse signal $D0_{1/2}$, which is delayed by 0.5 clocks from the output signal D0 of the first delay circuit 202, needs to be selected as the output pulse signal DOUT. Here, the expected value of the signal CNT is (0010)b, and accordingly the coefficient COMP selected as the four-bit signal COEF is made equal to (0010)b, i.e., +1.

Next, the state (3) shown in the figures will be described. In the state (2), the delayed pulse signal $D0_{1/2}$ was selected as the output pulse signal DOUT, and therefore, in the state (3), the signal CNT0 is equal to (0010)b. Here, to insert a delay corresponding to 5.25 clocks of the internal clock signal ICLK between the output pulse signal DOUT ($D0_{1/2}$) one period before and the output pulse signal DOUT that is about to be output, the delayed pulse signal $D0_{3/4}$, which is delayed by 0.75 clocks from the output signal D0 of the first delay circuit 202, needs to be selected as the output pulse signal DOUT. Here, the expected value of the signal CNT is (0011)b, and accordingly the coefficient COMP selected as the four-bit signal COEF is made equal to (0001)b, i.e., +1.

Next, the state (4) shown in the figures will be described. In the state (3), the delayed pulse signal $D0_{3/4}$ was selected as the output pulse signal DOUT, and therefore, in the state (4), the signal CNT0 is equal to (0011)b. Here, to insert a delay corresponding to 5.25 clocks of the internal clock signal ICLK between the output pulse signal DOUT ($D0_{3/4}$) one period before and the output pulse signal DOUT that is about to be output, the delayed pulse signal D1, which is delayed by 1 clock from the output signal D0 of the first delay circuit 202, needs to be selected as the output pulse signal DOUT. Here, the expected value of the signal CNT is (0100)b, and accordingly the coefficient COMP selected as the four-bit signal COEF is made equal to (0001)b, i.e., +1.

Next, the state (5) shown in the figures will be described. In the state (4), the delayed pulse signal D1 was selected as the output pulse signal DOUT, and therefore, in the state (5), the signal CNT0 is equal to (0100)b. Here, to insert a delay corresponding to 5.25 clocks of the internal clock signal ICLK between the output pulse signal DOUT (D1) one period before and the output pulse signal DOUT that is about to be output, the delayed pulse signal $D0_{1/4}$, which is delayed by 0.25 clocks from the output signal D0 of the first delay circuit 202, needs to be selected as the output pulse signal DOUT. Here, the expected value of the signal CNT is (0001)b, and accordingly the coefficient COMP selected as the four-bit signal COEF is made equal to (1101)b, i.e., −3.

By correcting the coefficient COMP selected as the four-bit signal COEF in this way, it is possible to make the actual value of the signal CNT equal to its expected value, and thereby keep constant the pulse period of the output pulse signal DOUT output from the output pulse generator circuit 200.

Next, how the coefficient COMP is generated in the operation described above will be described. As shown in FIG. 21B, the lowest two bits of each of the coefficients CNT and CNT0 in a given state are extracted and are individually expanded to four bits, and then the expanded coefficient CNT0 is subtracted from the expanded coefficient CNT to calculate the four-bit signal COEF (i.e., the coefficient COMP) in the next state.

Here, the lowest two bits of the coefficient CNT correspond to the second select signals SH and SQ output from the four-bit register 603. The lowest two bits of the coefficient CNT0 correspond to the delayed signals SHD and SQD, which are delayed by a predetermined time from the second select signals SH and SQ by the two-bit register 605.

Thus, the four-bit subtractor 609 provided in the coefficient generator circuit 601 generates the four-bit signal COEF (i.e., coefficient COMP) in the next stage by subtracting the delayed signals SHD and SQD expanded to four bits with the highest two bets "00" added thereto from the second select signals SH and SQ expanded to four bits with the highest two bits "00" added thereto. FIG. 22 is a table showing the relationship between the second select signals SH and SQ, the delayed signals SHD and SQD, and the coefficient COMP.

The above descriptions take up, as an example, the delay time controller circuit 203 provided in the voltage conversion circuit of the second embodiment. However, in the voltage conversion circuit of the first embodiment also, the delay time controller circuit 103 configured as described above can produce the first select signals S0 to S5.

Figure 23:
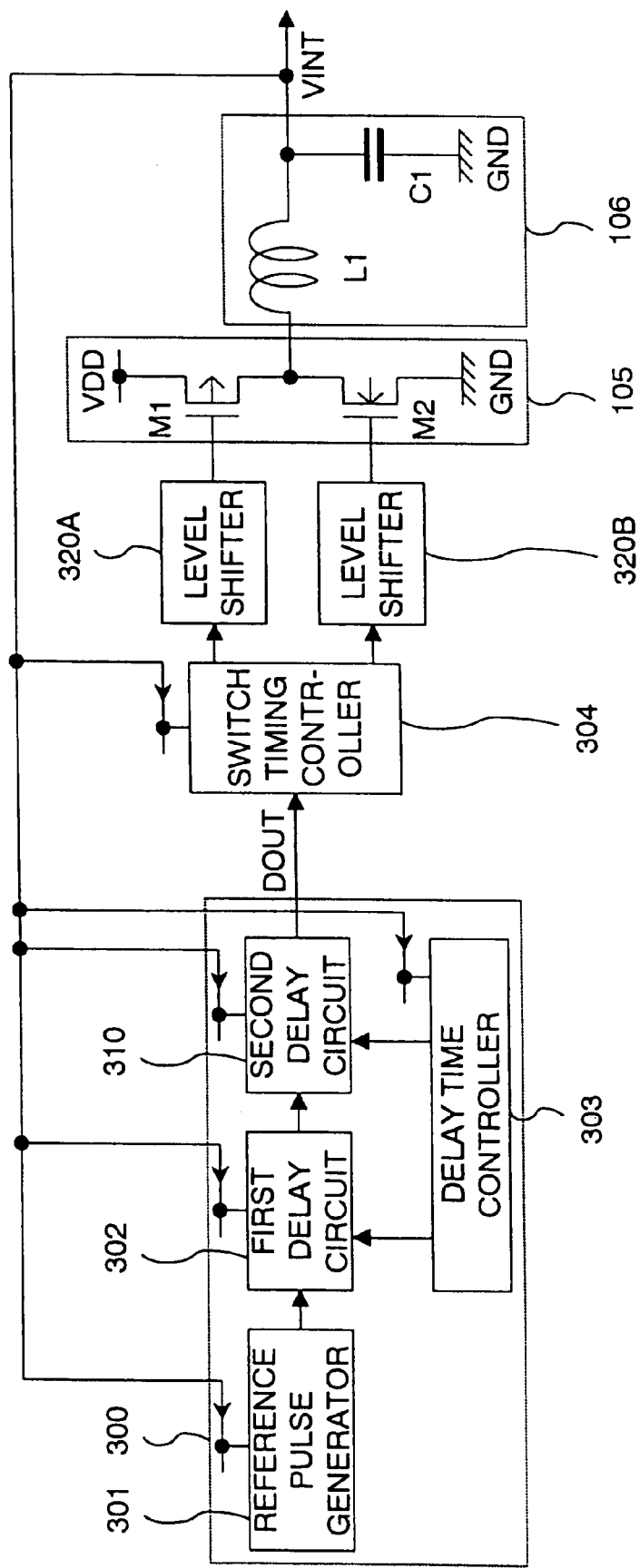
FIG. 23 is a diagram showing an outline of the configuration of the voltage conversion circuit of a third embodiment of the invention.
Figure 24:
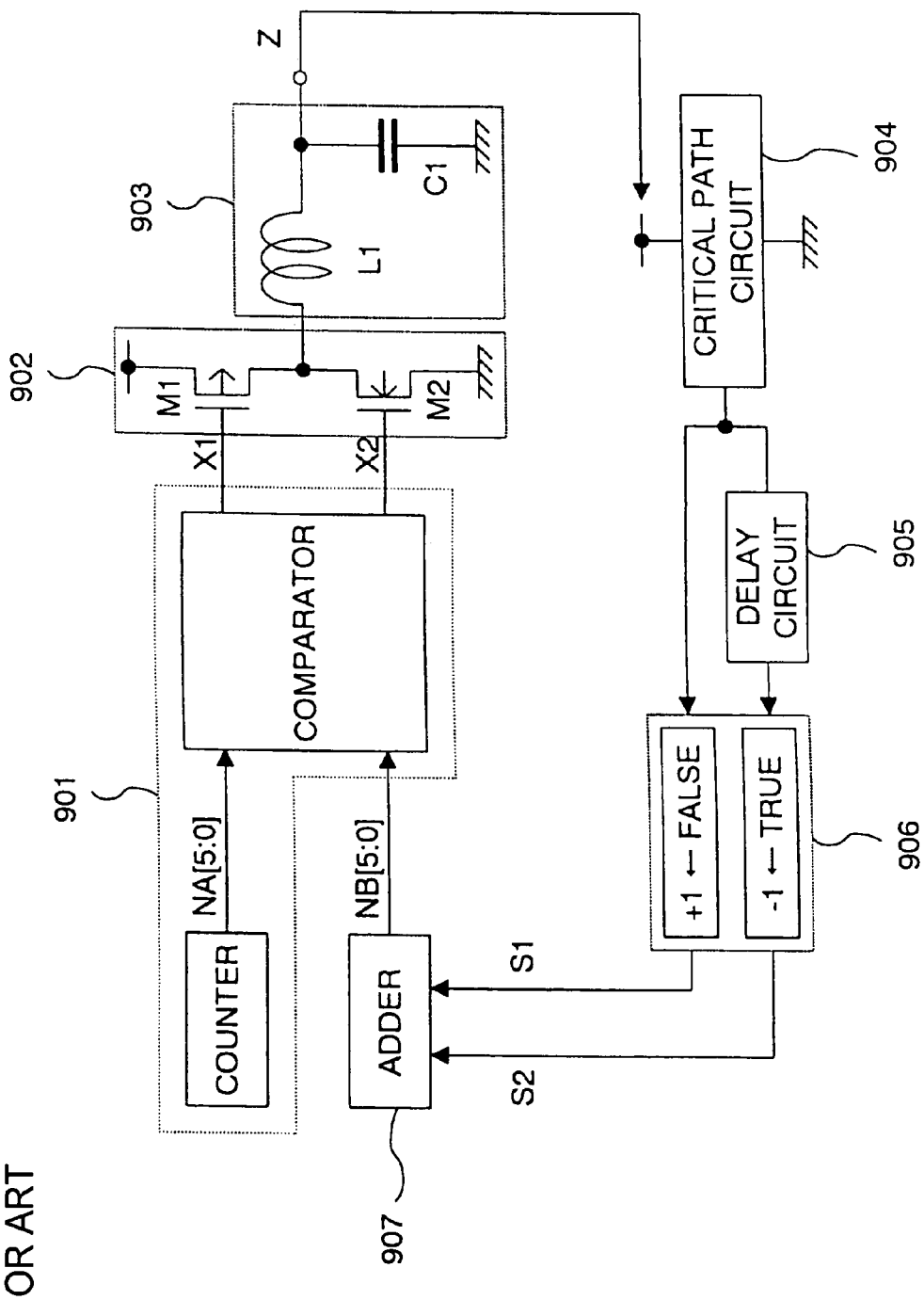
FIG. 24 is a diagram showing an outline of the configuration of an example of a conventional voltage conversion circuit.

Next, the voltage conversion circuit of a third embodiment of the invention will be described. FIG. 23 is a diagram showing an outline of the configuration of the voltage conversion circuit of the third embodiment of the invention. As shown in this figure, the voltage conversion circuit of this embodiment has basically the same configuration as the voltage conversion circuits of the first and second embodiments (see FIGS. 1 and 5), and is further characterized in that the output voltage VINT is supplied as a supply voltage to the output pulse generator circuit and the switch timing controller circuit. Therefore, here, such circuit blocks as are configured and operate in the same manner as in the first and second embodiments are identified with the same reference numerals and symbols, and their explanations will not be repeated.

As shown in the figure, the voltage conversion circuit of this embodiment includes an output pulse generator circuit 300 and a switch timing controller circuit 304. The output pulse generator circuit 300 is composed of a reference pulse generator circuit 301, a first and a second delay circuit 302 and 310, and a delay time controller circuit 303.

The reference pulse generator circuit 301, the first and second delay circuits 302 and 310, and the delay time controller circuit 303 may be configured in the same manner as the reference pulse generator circuit 101 (201), the first delay circuit 102 (202), the second delay circuit 210, and the delay time controller circuit 103 (203) provided in either of the first and second embodiments described above. The switch timing controller circuit 304 is configured in a similar manner as the switch timing controller circuit 104 provided in the voltage conversion circuits of the first and second embodiments described above.

In this embodiment, the reference pulse generator circuit 301, the first and second delay circuits 302 and 310, the delay time controller circuit 303, and the switch timing controller circuit 304 are supplied with, as a supply voltage, not the external supply voltage VDD but the output voltage VINT of the filter circuit 106.

When the switch timing controller circuit 304 is driven with the output voltage VINT output from the filter circuit 106, however, the high level of the first and second control signals φ1 and φ2 is equal to the output voltage VINT, and this may hinder proper control of the on/off states of the PMOS and NMOS transistors M1 and M2 constituting the switch circuit 105. To prevent this, the voltage levels of the first and second control signals φ1 and φ2 are raised to the necessary levels with step-up level shifters 320A and 320B provided in the output stage of the switch timing controller circuit 304.

By driving all the circuit blocks other than the switch circuit 105 and the filter circuit 106 with the output voltage VINT, which is lower than the external supply voltage VDD, in this way, it is possible to greatly reduce the power consumption of the voltage conversion circuit itself, contributing to reduction of the power consumption of the integrated circuit as a whole.

INDUSTRIAL APPLICABILITY

A voltage conversion circuit according to the present invention is suitably used as a voltage step-down circuit for generating from an external supply voltage a drive voltage for driving a semiconductor integrated circuit device. In recent years, as the power consumption of an internal circuit provided in a semiconductor integrated circuit device is reduced, on a relative basis, the proportion of the power consumption of a voltage step-down circuit in the power consumption of the integrated circuit as a whole has been increasing. Thus, by adopting a voltage conversion circuit according to the present invention as the voltage step-down circuit, it is possible to reduce the power consumption of the voltage step-down circuit itself, and thereby contribute to reduction of the power consumption of the semiconductor integrated circuit device as a whole without spoiling the low power consumption of the internal circuit.

The invention claimed is:

1. A voltage conversion circuit, comprising:
an output pulse generator circuit that generates an output pulse signal having a constant pulse width and having a variable pulse period; and
a voltage output unit determining an output voltage based on a ratio of the pulse width to the pulse period of the output pulse signal generated by the output pulse generator circuit,
the output pulse generator circuit includes
a reference pulse generator circuit that generates a reference pulse signal having a constant pulse width,
a first delay circuit that delays the reference pulse signal by one predetermined unit time after another to generate a plurality of pulse signals and then selects and outputs one of the plurality of pulse signals, the first delay circuit thereby delaying by a predetermined time the reference pulse signal, and
a second delay circuit that delays by an arbitrary time a pulse signal output from the first delay circuit, an output signal of the second delay circuit being fed out as the output pulse signal, wherein the second delay circuit comprises a plurality of arbitrary delay circuit portions connected in series, each portion selectively outputting one of a pulse signal fed thereto and a delayed pulse signal that is delayed for a predetermined time from that pulse signal fed thereto, and an output signal of a last-stage arbitrary delay circuit portion is fed out as an output signal of the second delay circuit.

2. A voltage conversion circuit comprising:
an output pulse generator circuit that generates an output pulse signal having a constant pulse width and having a variable pulse period;
a switch timing controller circuit that generates a first control signal and a second control signal from the output pulse signal;
a switch circuit having a PMOS transistor receiving a first supply voltage at a source thereof and receiving the first control signal at a gate thereof and an NMOS transistor receiving a second supply voltage at a source thereof and receiving the second control signal at a gate thereof, the switch circuit outputting a voltage from a node at which the drains of the PMOS and NMOS transistors are connected together; and
a filter circuit that smoothes the voltage output from the switch circuit to produce an output voltage;
the voltage conversion circuit varying the output voltage by controlling on/off states of the PMOS and NMOS transistors,
wherein the output pulse generator circuit includes:
a reference pulse generator circuit that generates a reference pulse signal having a constant pulse width;
a first delay circuit composed of a delay circuit portion having a plurality of delay elements connected in series each delaying by a predetermined unit time a pulse signal fed thereto and a selector portion that selects one among output signals of the individual delay elements constituting the delay circuit portion, the first delay circuit having an input end thereof connected to an output end of the reference pulse generator circuit;

a second delay circuit composed of a plurality of stages of arbitrary delay circuit portions connected in series, each portion selectively outputting one of a pulse signal fed thereto and a delayed pulse signal produced by delaying the pulse signal fed thereto by a predetermined time, the second delay circuit having an input end thereof connected to an output end of the first delay circuit; and a delay time controller circuit that controls output selection operation of the first and second delay circuits;

an output signal of the second delay circuit being fed as the output pulse signal to the switch timing controller circuit.

3. A voltage conversion circuit as claimed in claim 2, wherein the delay elements constituting the delay circuit portion of the first delay circuit and delay elements constituting the arbitrary delay circuit portions of the second delay circuit are all flip-flop circuits, and a clock frequency or phase with which the delay elements of the second delay circuit are driven is different from a clock frequency or phase with which the delay elements of the first delay circuit are driven.

4. A voltage conversion circuit as claimed in claim 2, wherein the switch timing controller circuit is so configured as to control voltage levels of the first and second control signals in such a way that the on/off states of the PMOS and NMOS transistors constituting the switch circuit are so controlled that first one of the PMOS and NMOS transistors is turned off and then, a predetermined time thereafter, the other of the PMOS and NMOS transistors is turned on.

5. A voltage conversion circuit as claimed in claim 2, wherein the delay time controller circuit includes a replica circuit that detects operation status of an internal circuit driven with the output voltage of the voltage conversion circuit in synchronism with a clock signal with which the internal circuit is driven, and a select signal generator circuit that generates select signals with which to control the output selection operation of the first and second delay circuits according to the operation status of the internal circuit as detected by the replica circuit.

6. A voltage conversion circuit as claimed in claim 5, wherein the replica circuit is composed of a first-half delay stage and a latter-half delay stage connected in series and includes a critical path circuit that produces in an input signal thereto a delay equivalent to a delay through a maximum delay path within the internal circuit, assuming that a delay time through the first-half delay stage is called a first operation time and that a delay time through the entire critical path circuit is called a second operation time, the replica circuit being so configured as to compare each of the first and second operation times with each of a first predetermined operation time and a second predetermined operation time longer than the first predetermined operation time so that, if the second operation time is shorter than the first predetermined operation time, the replica circuit judges that an operation rate of the internal circuit is too high and requests the select signal generator circuit to lengthen a delay time produced by the first and second delay circuits, if the first operation time is shorter than the first predetermined operation time and the second operation time is longer than the first predetermined operation time but shorter than the second predetermined operation time, the replica circuit judges that the operation rate of the internal circuit is appropriate and requests the select signal generator circuit to maintain the delay time produced by the first and second delay circuits, and if the first operation time is longer than the first predetermined operation time but the second operation time is shorter than the second predetermined operation time, or if the second operation time is longer than the second predetermined operation time, the replica circuit judges that there is insufficient margin in the operation rate of the internal circuit or that the operation rate of the internal circuit is too low and requests the select signal generator circuit to shorten the delay time produced by the first and second delay circuits.

7. A voltage conversion circuit as claimed in claim 6, wherein the replica circuit includes:

a first latch circuit that latches for the first predetermined operation time an output signal of the first-half delay stage of the critical path circuit;

a second latch circuit that latches for the first predetermined operation time an output signal of the latter-half delay stage of the critical path circuit;

a third latch circuit that latches for the second predetermined operation time the output signal of the latter-half delay stage of the critical path circuit;

the operation status of the internal circuit being detected based on output signals of the first to third latch circuits.

8. A voltage conversion circuit as claimed in claim 6, wherein the select signal generator circuit includes a judgment circuit portion that judges whether the delay time produced by the first and second delay circuits can be further lengthened or not even when the replica circuit judges that the operation rate of the internal circuit is appropriate.

9. A voltage conversion circuit as claimed in claim 2, further including:

a step-up level shifter that steps up the voltage levels of the first and second control signals output from the switch timing controller circuit and that feeds the stepped-up signals to the gates of the PMOS and NMOS transistors constituting the switch circuit;

wherein an output voltage of the filter circuit is supplied as a supply voltage to the output pulse generator circuit and the switch timing controller circuit.

10. A semiconductor integrated circuit device comprising the voltage conversion circuit as claimed in claim 2.

* * * * *